(12) United States Patent
Sternklar et al.

(10) Patent No.: US 11,698,277 B2
(45) Date of Patent: Jul. 11, 2023

(54) METHOD AND SYSTEM FOR DETERMINING GRATING PERTURBATION BY MODULATED LIGHT

(71) Applicant: Ariel Scientific Innovations Ltd., Ariel (IL)

(72) Inventors: Shmuel Sternklar, Yakir (IL); Ziv Glasser, Ariel (IL)

(73) Assignee: Ariel Scientific Innovations Ltd., Ariel (IL)

( * ) Notice: Subject to any disclaimer, the term of this patent is extended or adjusted under 35 U.S.C. 154(b) by 126 days.

(21) Appl. No.: 17/256,664

(22) PCT Filed: Jul. 4, 2019

(86) PCT No.: PCT/IL2019/050742
§ 371 (c)(1),
(2) Date: Dec. 29, 2020

(87) PCT Pub. No.: WO2020/008464
PCT Pub. Date: Jan. 9, 2020

(65) Prior Publication Data
US 2021/0262835 A1    Aug. 26, 2021

Related U.S. Application Data

(60) Provisional application No. 62/693,941, filed on Jul. 4, 2018.

(51) Int. Cl.
*G01D 5/353* (2006.01)
*G02B 6/26* (2006.01)
*G02B 6/34* (2006.01)

(52) U.S. Cl.
CPC ...... *G01D 5/35316* (2013.01); *G01D 5/35383* (2013.01); *G02B 6/26* (2013.01); *G02B 6/34* (2013.01); *Y02B 10/30* (2013.01)

(58) Field of Classification Search
CPC .......... G01D 5/35316; G01D 5/35383; G01D 5/268; G01D 5/35354; Y02B 10/30;
(Continued)

(56) References Cited

U.S. PATENT DOCUMENTS

| | | | |
|---|---|---|---|
| 4,957,365 | A | 9/1990 | Brinkmeyer |
| 5,426,297 | A | 6/1995 | Dunphy et al. |

(Continued)

FOREIGN PATENT DOCUMENTS

| | | |
|---|---|---|
| CN | 103344194 | 10/2013 |
| CN | 105333815 | 2/2016 |

(Continued)

OTHER PUBLICATIONS

International Preliminary Report on Patentability dated Jan. 14, 2021 From the International Bureau of WIPO Re. Application No. PCT/IL2019/050742. (10 Pages).
(Continued)

*Primary Examiner* — Jennifer D Bennett
*Assistant Examiner* — Erin R Garber

(57) ABSTRACT

A method of determining perturbation of a grating formed in an optical fiber, comprises: modulating and transmitting a light beam through the optical fiber, measuring at least one phase shift in a modulation of light reflected off the grating, and determining the perturbation of the grating based on the phase shift(s).

30 Claims, 7 Drawing Sheets

(58) Field of Classification Search
CPC .. G01B 9/02; G01B 11/2536; G01B 11/2527; G02B 6/26; G02B 6/34; G02B 2006/12107; G02B 6/02085; G02B 6/02147; G02B 6/02152; G02B 2006/12119; G02F 2201/307; G02F 1/0115; G02F 1/0147

See application file for complete search history.

(56) References Cited

U.S. PATENT DOCUMENTS

| | | | |
|---|---|---|---|
| 5,675,674 A * | 10/1997 | Weis | E21B 47/135 385/12 |
| 5,680,489 A * | 10/1997 | Kersey | G01M 11/086 385/12 |
| 5,748,312 A * | 5/1998 | Kersey | G01L 1/246 356/478 |
| 6,137,565 A | 10/2000 | Ecke et al. | |
| 6,285,806 B1 | 9/2001 | Kersey et al. | |
| 9,025,157 B2 | 5/2015 | Wen et al. | |
| 9,714,863 B2 | 7/2017 | Gotsmann et al. | |
| 2002/0041722 A1 | 4/2002 | Johnson et al. | |
| 2002/0063866 A1* | 5/2002 | Kersey | E21B 47/113 356/478 |
| 2004/0202400 A1 | 10/2004 | Kochergin et al. | |
| 2008/0204747 A1 | 8/2008 | Emmerson et al. | |
| 2010/0272391 A1* | 10/2010 | Onaka | G02B 6/12007 385/27 |
| 2013/0193961 A1 | 8/2013 | Wen et al. | |
| 2017/0131081 A1* | 5/2017 | Lau | G01B 11/14 |
| 2018/0003551 A1 | 1/2018 | Huignard et al. | |
| 2022/0381644 A1 | 12/2022 | Sternklar | |

FOREIGN PATENT DOCUMENTS

| | | |
|---|---|---|
| CN | 106100748 | 11/2016 |
| CN | 107947867 | 4/2018 |
| JP | 2008-020342 | 1/2008 |
| JP | 2015-198085 | 11/2015 |
| KR | 2000-0022321 | 4/2000 |
| KR | 10-0496554 | 11/2005 |
| WO | WO 2006/113507 | 10/2006 |
| WO | WO 2012/033718 | 3/2012 |
| WO | WO 2019/169507 | 9/2019 |
| WO | WO 2020/008464 | 1/2020 |
| WO | WO 2021/124340 | 6/2021 |

OTHER PUBLICATIONS

International Search Report and the Written Opinion dated Oct. 3, 2019 From the International Searching Authority Re. Application No. PCT/IL2019/050742. (18 Pages).
Balbi et al. "Analysis of Temperature Dependence of Ge—On—Si P-I-N Phtodetectors", Physica E: Low-Dimensional Systems and Nanostructures, 41(6): 1086-1089, May 1, 2009.
Clement Bellido et al. "Spectral Analysis Using a Dispersive Microwave Photonics Link Based on a Broadband Chirped Fiber Bragg Grating", Journal of Lightwave Technology, 33(20): 4207-4214, Published Online Aug. 10, 2015.
Dash et al. "Intrinsic Optical Absorption in Single-Crystal Germanium and Silicon at 77°K and 300°K", Physical Review, 99(4): 1151-1155, Aug. 15, 1955.
Dennis et al. "Achieving High Absolute Accuracv for Group-Delay Measurements Using the Modulation Phase-Shift Technique", 23(10): 3748-3754, Nov. 2005.
First Sensor "First Sensor WS PD Data Sheet", First Sensor, Part Description WS7.56 TO, Order# 3001222, p. 1-3, Revised Feb. 14, 2018.
Glasser et al. "Phaseless Incoherent Optical Frequency Domain Spectroscopy", Optics Letters, 42(9): 1848-1851, Published Online Apr. 11, 2017.
Goushcha et al. "On Response Time of Semiconductor Photodiodes", Optical Engineering, 59(9): 097101-1-097101-8, Published Online Sep. 8, 2017.
Harris "Optical Properties of Si, Ge, GaAs, GaSb, InAs, and InP at Elevated Temperatures", Department of the Air Force Air University, Air Force Institute of Technology, Wright-Patterson Air Force Base, Ohio, USA, AFIT Scholar, Theses and Dissertations, Thesis Presented to the Faculty, Department of Engineering Physics, Graduate School of Engineering and Managment, Air Force Institute of Technology in Partial Fulfillment of the Requirements for the Degree of Master of Science in Engineering Physics, p. 1-64, Oct. 3, 2010.
Hervas et al. "An Interrogation Technique of FBG Cascade Sensors Using Wavelength to Radio-Frequency Delay Mapping", Journal of Lightwave Technology, 33(11): 2222-2226, Published Online Mar. 5, 2015.
Jang et al. "Wavelength Dependent Characteristics of High-Speed Metamorphic Photodiodes", IEEE Photonics Technology Letters, 15(2): 281-283, Feb. 2003.
Li et al. "Microwave Photonic Signal Processing and Sensing Based on Optical Filtering", Applied Sciences, 9(1): 163-1-163-12, Published Online Jan. 4, 2019.
Lucovsky et al. "Coherent Light Detection in Solid-State Photodiodes", Proceedings of the IEEE, 51(1): 166-172, Jan. 1963.
Lucovsky et al. "Transit-Time Considerations in P-I-N Diodes", Journal of Applied Physics, 35(3/Pt.l): 622-629, Mar. 1964.
Open Photonics "Wavelength Shift Detection", Open Photonics, Inc., Open Photonics Partner: PARC. A Xerox Company, 2 P., Sep. 9, 2015.
Sawyer et al. "Narrow Base Germanium Photodiodes", Proceedings of the IRE, 46(6): 1122-1130, Jun. 1958.
Yi et al. "Integrated Microwave Photonics for Wideband Signal Processing", Photonics, 4(4): 46-1-46-14, Published Online Nov. 30, 2017.
Yuksel et al. "Optical Frequency Domain Reflectometry: A Review", 2009 11th International Conference on Transparent Optical Networks, ICTON 2009, Azores, Portugal, Jun. 28-Jul. 2, 2009, p. 1-5, Jun. 28, 2009.
Notification of Office Action and Search Report dated Aug. 18, 2022 From the State Intellectual Property Office of the People's Republic of China Re. Application No. 201980046270.7 (10 Pages).
Invitation to Pay Additional Fees and Communication Relating to the Result of the Partial International Search dated Apr. 11, 2021 From the International Searching Authority Re. Application No. PCT/IL2020/051311. (5 Pages).
English Translation Dated Jan. 3, 2021 of Notification of Office Action and Search Report dated Dec. 17, 2021 From the State Intellectual Property Office of the People's Republic of China Re. Application No. 201980046270.7. (4 Pages).
Notification of Office Action and Search Report dated Dec. 17, 2021 From the State Intellectual Property Office of the People's Republic of China Re. Application No. 20'980046270.7. (12 Pages).
State Intellectual Property Office of the People's Republic of China Re. Application No. 201980046270.7 together with its Summary in English. (14 Pages).
International Search Report and the Written Opinion dated May 31, 2021 From the International Searching Authority Re. Application No. PCT/IL2020/051311. (14 Pages).
Ma et al. "Modulators for Terahertz Communication: The Current State of the Art", Research 2019, May 29, 2019.
International Preliminary Report on Patentability dated Jan. 14, 2021 From the International Bureau of WIPO Re. Application No. PCT/IL2020/051311. (9 Pages).
Office Action dated Feb. 28, 2022 From the Israel Patent Office Re. Application No. 279954. (3 Pages).
Supplementary European Search Report and the European Search Opinion dated Feb. 22, 2022 From the European Patent Office Re. Application No. 19830499.0. (10 Pages).
Diminstein et al. Dispersion-Based Differential Wavelength Measurements for Bragg Grating Sensors, Electronics Letters,37(1):12-14, Jan. 4, 2001.
Notice of Reasons for Rejection dated Oct. 4, 2022 From the Japan Patent Office Re. Application No. 2020-569076. (5 Pages).

(56) References Cited

OTHER PUBLICATIONS

Communication Pursuant to Article 94(3) EPC dated Feb. 13, 2023 From the European Patent Office Re. Application No. 19830499.0 (10 Pages).
Notice of Reason(s) for Rejection dated Mar. 20, 2023 From the Japan Patent Office Re. Application No. 2020-569076. (5 pages).
Translation Dated Apr. 4, 2023 of Notice of Reason(s) for Rejection dated Mar. 20, 2023 From the Japan Patent Office Re. Application No. 2020-569076. (5 pages).

* cited by examiner

METHOD AND SYSTEM FOR DETERMINING GRATING PERTURBATION BY MODULATED LIGHT

RELATED APPLICATION

This application is a National Phase of PCT Patent Application No. PCT/IL2019/050742 having International filing date of Jul. 4, 2019, which claims the benefit of priority under 35 USC § 119(e) of U.S. Provisional Patent Application No. 62/693,941 filed on Jul. 4, 2018. The contents of the above applications are all incorporated by reference as if fully set forth herein in their entirety.

FIELD AND BACKGROUND OF THE INVENTION

The present invention, in some embodiments thereof, relates to a sensor system and, more particularly, but not exclusively, to a method and a system for sensing by reflection of modulated light, e.g., by a fiber Bragg grating (FBG).

FBGs are a well known component used in the fields of optical fiber sensing and communications, and typically comprise a repeating pattern written into a photosensitive optical fiber. When illuminated, a Bragg grating reflects a component of light at wavelengths within a range whose central wavelength and bandwidth depend on the properties of the grating (e.g., pitch, refractive index, length of the grating). The central wavelength and bandwidth of this range are referred to as the Bragg wavelength and FBG bandwidth, respectively. A perturbation of the grating, for example, by temperature, pressure, strain, vibration or the like, results in a shift in the Bragg wavelength (referred to as "Bragg shift"), which can be detected in the reflected spectrum. This shift can then be compared with the unperturbed Bragg wavelength to determine the extent of the perturbation.

Thus, an FBG can serve as a sensor. FBG sensors are particularly useful as embedded sensors for smart structures where the sensors can be used for real time evaluation of temperature, pressure, strain, vibration and the like. Since many gratings can be written into a length of fiber and addressed using multiplexing techniques, FBG sensors can provide quasi-distributed sensing capabilities.

Conventionally, the shift in Bragg wavelength is measured with the aid of spectral analysis techniques such as interferometers, tunable optical filters, tunable lasers or diffraction elements [Chen et al., "Review of fiber Bragg grating sensor technology", Front. Optoelectron. China 4 204 (2011)].

In the field of large distance optical communication, it is known to measure dispersion in an optical fiber by linearly dispersing ultra-short pulses in the fiber and mapping their spectrum to the time domain. This allows mapping the dispersion by measuring the delay between two spikes in the dispersed pulse's temporal profile [Tong et al., "Fibre dispersion or pulse spectrum measurement using a sampling oscilloscope", Electronics Lett. 33(11) 983-985 (1997)].

SUMMARY OF THE INVENTION

According to an aspect of some embodiments of the present invention there is provided a method of determining perturbation of a grating formed in an optical fiber. The method comprises: modulating and transmitting a light beam through the optical fiber, measuring at least one phase shift in a modulation of light reflected off the grating, and determining the perturbation of the grating based on the phase shift(s).

According to some embodiments of the invention the modulation is applied before the transmitting. According to some embodiments of the invention the modulation is applied after the light beam is reflected off the grating. According to some embodiments of the invention, the modulation is applied before the transmitting as well as after the light beam is reflected off the grating.

According to some embodiments of the invention, the optical fiber is formed with a plurality of gratings, wherein two or more of the gratings are characterized by different Bragg wavelengths.

According to some embodiments of the invention, the invention the method comprises de-multiplexing the reflected light beam into two or more channels, respectively corresponding to the different Bragg wavelengths, prior to the measurement of the phase shift(s).

According to some embodiments of the invention the method comprises scanning a frequency of the modulation over a plurality of modulation frequencies, wherein the method comprises measuring a modulation phase shift and modulation magnitude of light reflected off the gratings for each modulation frequency, and determining an individual optical wavelength or optical frequency shift for each of the two or more gratings, based on the measured modulation phase shifts and measured modulation magnitudes.

According to some embodiments of the invention the method comprises dispersing the reflected light beam prior to the measurement of the phase shift(s).

According to some embodiments of the invention dispersing is performed by a chirped grating formed in an optical fiber.

According to some embodiments of the invention dispersing is performed by an optical fiber spool.

According to some embodiments of the invention the measurement of the phase shift is characterized by a predetermined phase resolution, and the dispersing is characterized by a predetermined dispersion parameter describing pulse broadening per unit wavelength, wherein a frequency of the modulation is at least a ratio between the phase resolution and a multiplication of the dispersion parameter by a predetermined spectral resolution threshold.

According to some embodiments of the invention the predetermined spectral resolution threshold is less than 0.1 picometer and the measurement of the phase shift(s) is at a sampling rate of at least 1 kHz.

According to some embodiments of the invention the dispersion is characterized by a dispersion coefficient, wherein the method comprises varying a value of the coefficient over a plurality of dispersion coefficient values, measuring a modulation phase shift and modulation magnitude of light reflected off the grating for each value of the dispersion coefficient, and determining an individual optical wavelength or optical frequency shift for each of the two or more gratings, based on the measured modulation phase shifts and measured modulation magnitudes.

According to some embodiments of the invention the modulation comprises radiofrequency modulation. According to some embodiments of the invention, the modulation comprises sinusoidal modulation.

According to some embodiments of the invention, the method comprises amplifying the light beam prior to the transmission.

According to some embodiments of the invention, the determination of the perturbation of the grating is not on an optical power of the reflected light beam.

According to some embodiments of the invention, the method is executed without determining an optical power of the reflected light beam.

According to some embodiments of the invention, the determination of the perturbation of the grating comprises expressing the perturbation as a shift in a Bragg wavelength characterizing the grating.

According to some embodiments of the invention, the method comprises using the shift in the Bragg wavelength for calculating at least one physical quantity effecting the perturbation of the grating.

According to some embodiments of the invention, the determination of the perturbation of the grating comprises expressing the perturbation as at least one physical quantity effecting the perturbation of the grating.

According to some embodiments of the invention the physical quantity(ies) is selected from the group consisting of ambient temperature, pressure applied to the fiber, strain of the fiber, and accelerative motion of the fiber.

According to an aspect of some embodiments of the present invention there is provided a system for determining perturbation of a grating formed in an optical fiber. The system comprises: an optical modulation system for modulating a light beam; an optical coupler for coupling the light beam into the optical fiber and receiving light reflected off the grating; and an optical and electrical analysis system configured for measuring at least one phase shift in a modulation of light reflected off the grating, and determining the perturbation of the grating based on the phase shift(s).

According to an aspect of some embodiments of the present invention there is provided a sensor system. The sensor system comprises: an optical modulation system for modulating a light beam; an optical coupler for coupling the light beam into the optical fiber and receiving light reflected off the grating; and an optical and electrical analysis system configured for measuring at least one phase shift in a modulation of light reflected off the grating, and determining at least one physical quantity effecting a perturbation of the grating.

According to some embodiments of the invention the physical quantity(ies) is selected from the group consisting of ambient temperature, pressure applied to the fiber, strain of the fiber, and accelerative motion of the fiber.

According to some embodiments of the invention the optical modulation system is configured to modulate the light beam before the transmission. According to some embodiments of the invention, the optical modulation system is configured to modulate the light beam after the light beam is reflected off the grating. According to some embodiments of the invention, the optical modulation system is configured to modulate the light beam before the transmitting as well as after the light beam is reflected off the grating.

According to some embodiments of the invention, the optical fiber is formed with a plurality of gratings, wherein two or more of the gratings are characterized by different Bragg wavelengths.

According to some embodiments of the invention, the analysis system comprises an optical de-multiplexing system for de-multiplexing the reflected light beam into two or more channels, respectively corresponding to the different Bragg wavelengths, prior to the measurement of the phase shift(s).

According to some embodiments of the invention the analysis system comprises a plurality of light detectors, one for each of the channels.

According to some embodiments of the invention the optical modulation system is configured for scanning a frequency of the modulation over a plurality of modulation frequencies, wherein the optical and electrical analysis system is configured for measuring a modulation phase shift and modulation magnitude of light reflected off the grating for each modulation frequency, and for determining an individual optical wavelength or optical frequency shift for each of the two or more gratings, based on the measured modulation phase shifts and measured modulation magnitudes.

According to some embodiments of the invention the analysis system comprises a single light detector.

According to some embodiments of the invention the analysis system comprises a dispersive optical device configured for dispersing the reflected light beam prior to the measurement of the phase shift(s).

According to some embodiments of the invention, the dispersive optical device comprises a chirped grating formed in an optical fiber. According to some embodiments of the invention, the dispersive optical device comprises an optical fiber spool.

According to some embodiments of the invention the analysis system comprises a signal processing system configured for measuring the phase shift(s) at a predetermined phase resolution, wherein the dispersive optical device is configured for effecting dispersing according to a predetermined dispersion parameter describing pulse broadening per unit wavelength, wherein the optical modulation system is configured for modulating the light beam at a frequency which is at least a ratio between the phase resolution and a multiplication of the dispersion parameter by a predetermined spectral resolution threshold.

According to some embodiments of the invention, the predetermined spectral resolution threshold is less than 10 picometers.

According to some embodiments of the invention, the predetermined spectral resolution threshold is less than 0.1 picometer, wherein the signal processing system is configured for measuring the phase shift(s) at a sampling rate of at least 1 kHz.

According to some embodiments of the invention the dispersive optical device is controllable, wherein the system comprises a dispersion controller for controlling the dispersive optical device so as to vary a value of a dispersion coefficient characterizing the dispersive optical device, wherein the optical and electrical analysis system is configured for measuring a modulation phase shift and modulation magnitude of light reflected off the grating for different values of the dispersion coefficient, and determining an individual optical wavelength or optical frequency shift for each of the two or more gratings, based on the measured modulation phase shifts and measured modulation magnitudes.

According to some embodiments of the invention, the method comprises an optical amplifier for amplifying the light beam prior to the transmission.

According to an aspect of some embodiments of the present invention there is provided a method of determining perturbation of a plurality of gratings formed in an optical fiber. The method comprises: modulating and transmitting a light beam through the optical fiber, wherein the modulation comprises scanning a frequency of the modulation over a plurality of modulation frequencies; measuring a modulation phase shift and modulation magnitude of light reflected off the grating for each modulation frequency; and determining perturbation of two or more of the gratings based on the measured modulation phase shifts and measured modulation magnitudes.

According to some embodiments of the invention the method comprises dispersing the light reflected off the grating using a controllable dispersive optical device, wherein the dispersing comprises controlling the dispersive optical device so as to vary a value of a dispersion coefficient characterizing the dispersive optical device, wherein the method comprises measuring the modulation phase shift and modulation magnitude also for different values of the dispersion coefficient.

According to an aspect of some embodiments of the present invention there is provided a method of determining perturbation of a plurality of gratings formed in an optical fiber. The method comprises: modulating and transmitting a light beam through the optical fiber; dispersing light reflected off the grating using a controllable dispersive optical device, wherein the dispersing comprises controlling the dispersive optical device so as to vary a value of a dispersion coefficient characterizing the dispersive optical device; measuring a modulation phase shift and modulation magnitude of light reflected off the grating for different values of the dispersion coefficient; and determining perturbation of two or more of the gratings based on the measured modulation phase shifts and measured modulation magnitudes.

According to some embodiments of the invention, the modulation is executed before the transmitting.

According to some embodiments of the invention the modulation is executed after the light beam is reflected off the grating.

According to some embodiments of the invention, the modulation is executed before the transmitting as well as after the light beam is reflected off the grating.

According to some embodiments of the invention the determining the perturbation comprises calculating an optical wavelength or optical frequency shift caused by a respective grating.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
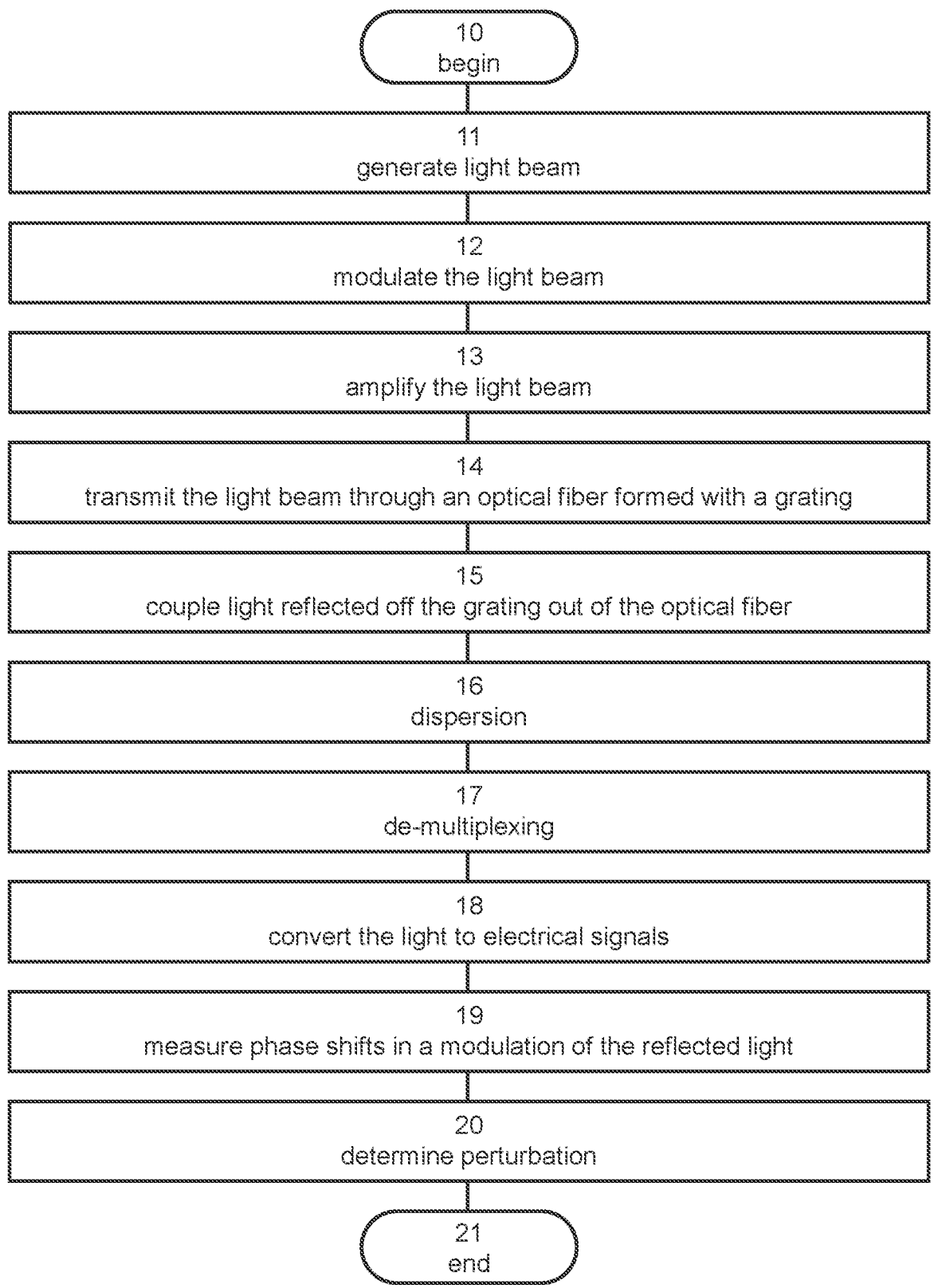
FIG. 1 is flowchart diagram of a method suitable for determining perturbation of a grating formed in an optical fiber, according to some embodiments of the present invention.

The present invention, in some embodiments thereof, relates to a sensor system and, more particularly, but not exclusively, to a method and a system for sensing by reflection of modulated light, e.g., by a fiber Bragg grating (FBG).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

In conventional FBG sensors the Bragg shift caused by a perturbation in an FBG is typically measured by spectral analysis techniques such as spectrometers, interferometers, tunable optical filters, tunable lasers or diffraction elements. The inventors realized that these techniques are complicated, and require expensive equipment for achieving adequate accuracy. The inventors also realized that techniques that rely on the need to employ laser frequency sweep limits the measurement speed, especially if the sweep is done mechanically. Other systems measure the time response of a pulse passing through a dispersive element. The Inventors found that this type of technique also requires expensive tools such as modulators capable of modulating ultrashort pulses and fast electronic detection devices. The Inventors also found that this technique has additional disadvantages such as the need to resolve the temporal response in the frequency domain, which limits the spectral resolution.

In a search for a technique that optionally and preferably overcomes the above problems, and/or for a technique that is optionally and preferably more accurate and/or executable at higher speeds, the Inventors devised a method and a system that acquire interrogator data from the grating(s) directly from the modulation of light reflected off the grating(s). The inventors found that such direct acquisition benefits from many advantages, and at the same time is overcomes one or more of the aforementioned drawbacks. Firstly, the technique enjoys high noise rejection and high-speed measurements, since it does not require a spectral sweep. Secondly, the technique can be executed using relatively low cost equipment compared to the equipment required for fast time-domain measurements. Thirdly, unlike conventional techniques for resolving the temporal response in the frequency domain, for which the resolution is bounded by the fading effect, the technique according to some embodiments of the present invention selects the working frequency in accordance with the periodicity in the fading effect, thereby improving the resolution.

Figure 2:
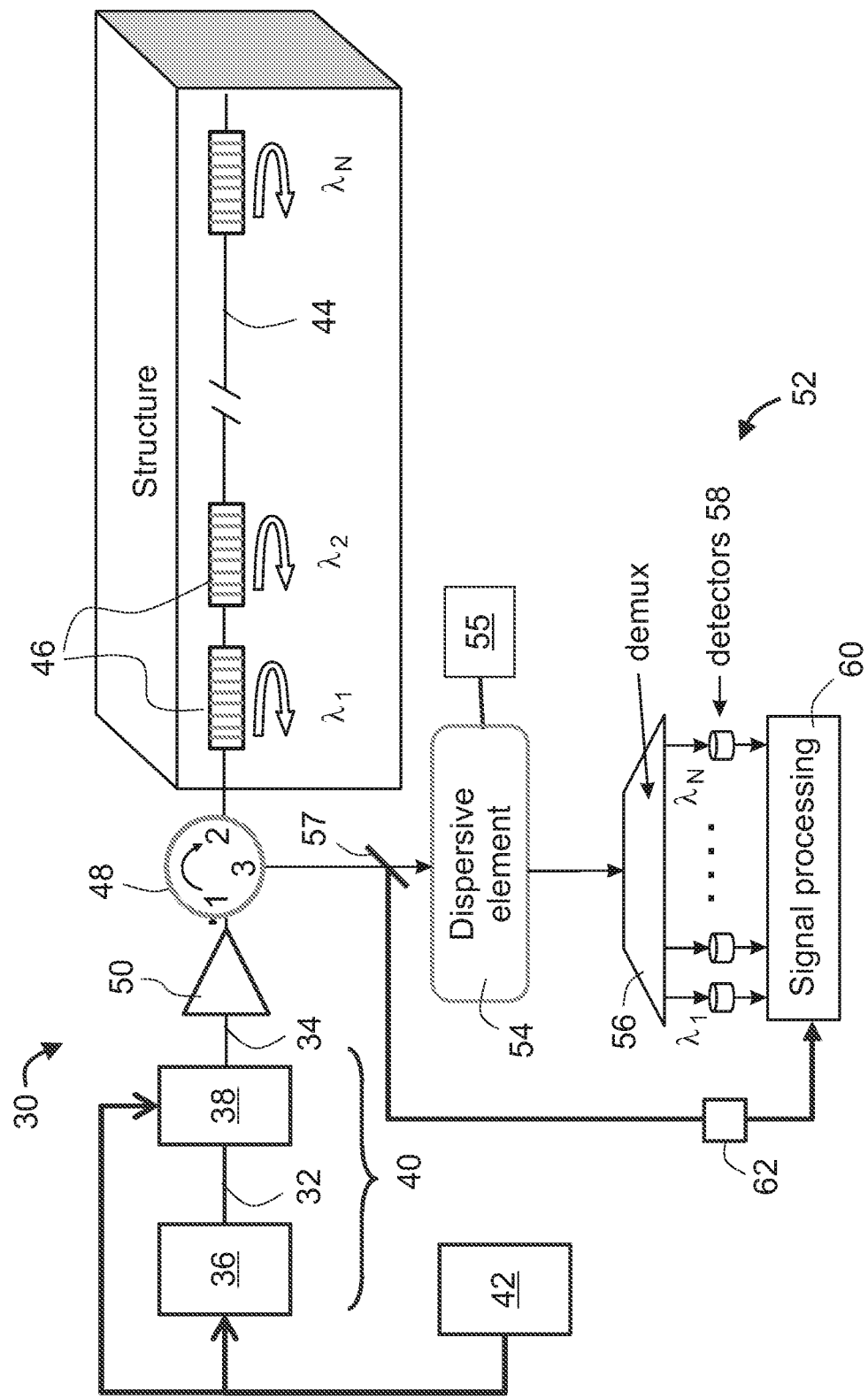
FIG. 2 is a schematic illustration of a system suitable for determining perturbation of a grating formed in an optical fiber, according to some embodiments of the present invention.
Figure 10:
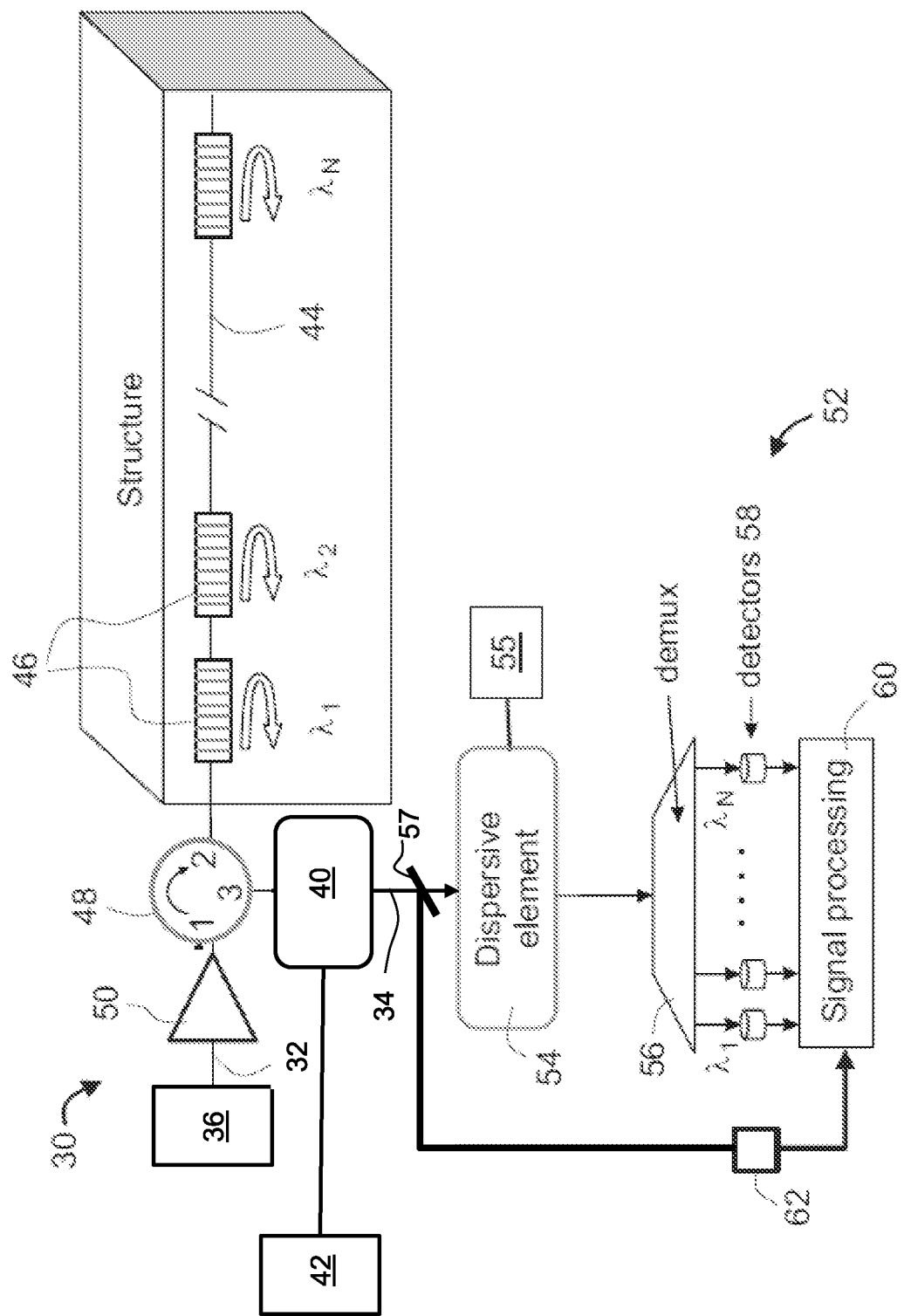
FIG. 10 is a schematic illustration of a system suitable for determining perturbation of a grating formed in an optical fiber, according to other embodiments of the present invention.

Referring now to the drawings, FIG. 1 is flowchart diagram of a method suitable for determining perturbation of a grating formed in an optical fiber, and FIGS. 2 and 10 are schematic illustrations of a system 30 suitable for determining perturbation of a grating formed in an optical fiber, according to some embodiments of the present invention. In a preferred embodiment, system 30 can be used for executing at least a few of the operations of the method.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 10 and optionally and preferably continues to 11 at which a light beam is generated, and to 12 at which the light beam is modulated to provide a modulated light beam 34. The light can be infrared light, visible light or ultraviolet light as desired. Preferably, the light is infrared light.

The generation 11 and modulation 12 can be executed by an optical modulation system 40. The modulation can be either a direct modulation or an external modulation, and of any type known in the art. When direct modulation is employed, a light source 36 receives a modulation signal from a controller 42 and generates modulated light beam 34. When external modulation is employed, an unmodulated light beam 32 is generated by light source 36 and is modulated by an optical modulator 38 that receives the modulation signal from controller 42. Controller 42 can include a dedicated circuit for generating the modulation signal.

The modulation can be at any frequency range, such as, but not limited to, radiofrequency. When radiofrequency modulation is employed the modulation frequency is optionally and preferably from about 1 kHz to about 40 GHz. In various exemplary embodiments of the invention the modulation is a sinusoidal modulation, but modulation waveforms other sinusoidal are also contemplated in some embodiments. Also contemplated are embodiments in which a multi-frequency modulation is employed, for example, by a sum of sinusoidal signals, each at a different frequency. The modulation can be executed to modulate any of the amplitude, frequency and phase of the light beam, including modulations of two or more of the amplitude, frequency and phase. In a preferred embodiment, at least amplitude modulation is employed, and in a more preferred embodiment, only amplitude modulation is employed wherein the frequency and phase are not modulated.

The present embodiments also contemplate modulation scanning, wherein a frequency of the modulation is scanned over a plurality of modulation frequencies. The advantage of these embodiments is explained below. It is to be understood, however, that it is not necessary to employ modulation scanning, and that the method according to some embodiments of the present invention can be practiced also when the modulation is without frequency scanning.

In some optional embodiments of the present invention the method proceeds to 13 at which light beam 34 is amplified. This can optionally and preferably be achieved by an optical amplifier 50, such as, but not limited to, an erbium-doped fiber amplifier (EDFA), an ytterbium-doped fiber amplifier (YDFA, a Raman amplifier, a hybrid Raman/erbium-doped amplifier, a hybrid Raman/ytterbium-doped amplifier, a erbium-ytterbium co-doped fiber amplifier, a neodymium-doped fiber amplifier, a thulium-doped fiber amplifier, and the like.

The method can proceed to 14 at which the modulated light beam 34 is transmitted through an optical fiber 44 having one or more gratings 46 formed therein, and to 15 at which light reflected off the grating(s) 46 is coupled out of optical fiber 44. The grating(s) can be fabricated within the entire or part of the core's cross-section or at the core-cladding interface of fiber 44, or in other fiber sections as known in the art. The optical fiber 44 is optionally and preferably an optical fiber with a FBG sensor or an array of FBG sensors. The grating 46 is constituted to selectively reflect a component of the light that has wavelengths within a particular Bragg bandwidth centered at a particular Bragg wavelength, and to allow other components to continue to propagate in the fiber 44. When optical fiber 44 has a plurality of gratings, each of at least two of the gratings, more preferably each of the gratings formed in fiber 44, is constituted to selectively reflect a different component of the light. Thus, each grating 46 of fiber 44 is characterized by a Bragg wavelength (and a corresponding Bragg bandwidth), wherein at least two of the gratings are characterized by a different Bragg wavelength. Shown in FIG. 2, is a fiber with N gratings, characterized by a set of N different respective Bragg wavelengths, denoted $\lambda_1, \lambda_2, \ldots, \lambda_N$. The gratings need not to be ordered according to their $\lambda$ values.

In various exemplary embodiments of the invention optical fiber 44 is deployed on or embedded within a structure such as, but not limited to, an airplane wing, a fence, a wind turbine blade, a building, a bridge, a culvert, a tunnel lining, a pipeline, a river, a flood control reservoir, a well, and the like.

The in-coupling and out-coupling of light into—and out of—fiber 44 is optionally and preferably via one or more optical couplers 48 which provide optical coupling between system 40 and fiber 44, and optionally and preferably also between fiber 44 and an optical and electrical analysis system generally shown at 52. In the schematic illustration shown in FIG. 2, which is not to be considered as limiting, optical coupler 48 is shown as an optical circulator having three of more input/output (I/O) ports (three shown in the present example), wherein at least one port is in optical communication with system 40 and at least one port is in optical communication with fiber 44. In FIG. 2, light beam 34 enters circulator 48 through its first port (1) and exits through its second port (2) into fiber 44. Light reflected off the grating(s) 46 propagates backwards in fiber 44, enters circulator 48 through its second port (2) and exits through its third port (3). From the third port the reflect light optionally and preferably enters system 52 for performing processing and analysis as further detailed hereinbelow.

In some optional embodiments of the present invention, modulation 12 is executed after the light exits fiber 44. In these embodiments, it is not necessary to carry out modulation 12 before transmitting the light to the fiber. Yet, embodiments in which modulation 12 is applied two or more times (e.g., before the light is coupled into the fiber, and after the light exits the fiber) are also contemplated.

In some embodiments of the present invention the method proceeds to 16 at which the reflected light beam is dispersed. Operation 16 is executed so as to increase the group velocity dispersion (GVD) of the reflected light beam. Preferably, following operation 16, the magnitude of the GVD of the light beam is larger (e.g., 2 times or 4 times or 8 times or 10 times larger) than the magnitude of the combined effective GVD of all the other components in system 52. Operation 16 is optionally and preferably performed by a dispersive optical device 54, which in some embodiments of the present invention is a component of system 52. Alternatively, or additionally, operation 16 can be performed also by the grating(s) of the fiber itself.

Representative examples of dispersive optical devices suitable to be used as device 54 include, without limitation, a chirped grating formed in an optical fiber (e.g., a chirped FBG, such as, but not limited to, the chirped FBG marketed by Teraxion, Canada), a dispersion compensating fiber (DCF), and an optical fiber spool.

It is expected that during the life of a patent maturing from this application many relevant optical devices that disperse light will be developed and the scope of the term dispersive optical device is intended to include all such new technologies a priori.

The dispersion provided by dispersive optical device 54 is typically characterized by a dispersion coefficient $\check{D}$. The $\check{D}$ parameter describes the amount of broadening of an optical pulse propagating in the dispersive optical device per unit of wavelength, typically in units of ps/nm. Suitable for the present embodiments are dispersive optical devices capable of effecting dispersion characterized by a positive or negative dispersion parameter $\check{D}$ having an absolute value of at least 100 ps/nm or at least 300 ps/nm or at least 1000 ps/nm or at least 1500 ps/nm or at least 2000 ps/nm or at least 2500 ps/nm.

In some embodiments of the present invention, dispersive optical device 54 is controllable, wherein the dispersion coefficient $\check{D}$ can be varied, for example, by means of a dispersion controller 55. Variation of the dispersion coefficient can be achieved, for example, by effecting a strain on device 54 (e.g., by applying stress or tension thereto) and/or by changing its temperature. Dispersion controller 55 is preferably a structure configured for applying stress and/or tension and/or temperature to device 45. The present embodiments also contemplate dispersion scanning, wherein the dispersion coefficient $\check{D}$ is scanned over a plurality of the dispersion coefficients. The advantage of these embodiments is explained below. It is to be understood, however, that it is not necessary to employ dispersion scanning, and that the method according to some embodiments of the present invention can be practiced also when dispersive optical device 54 is characterized by a fixed value of the dispersion coefficient.

When fiber 44 comprises two or more gratings 46 the method optionally and preferably proceeds to 17 at which a de-multiplexing is applied to the reflected light beam. The de-multiplexing 17 is preferably executed to provide two or more spatially separated optical channels, each corresponding to a Bragg wavelength that characterizes a different grating of fiber 44. The de-multiplexing 17 can be executed using an optical de-multiplexing system 56, which can also be a component of system 52. De-multiplexing system 56 can be of any type, including, without limitation, an arrayed waveguide grating, a photonic crystal fiber and the like. Shown in FIG. 2 is an optical de-multiplexing system, which produces N channels each corresponding to one Bragg wavelength of the aforementioned set $\lambda_1, \lambda_2, \ldots, \lambda_N$.

It is to be understood that is not necessary to de-multiplex the reflect light even when fiber 44 comprises a plurality of gratings 46. For example, when modulation scanning is employed, the multiplicity of modulation frequencies can provide sufficient information regarding the contribution of more than one grating, as is further explained below. Another example is when dispersion scanning is employed, in which case the multiplicity of values of the dispersion coefficients can provide sufficient information regarding the contribution of more than one grating, as is further explained below.

At 18 the light is preferably converted into electrical signals, for example, by using an optical detector (e.g., a selector having a single optical sensor), or an array of optical detectors 58 (one for each optical channel, in embodiments in which the light is de-multiplexed into channel), and at 19 at least phase shifts in a modulation of the reflected light off the grating(s) 46 are measured, for example, by a signal processing system 60, as illustrated in FIG. 2. In some embodiments of the present invention operating 19 also includes measuring the magnitude of the signal.

The present Inventors found that the modulation phase shift is indicative of a perturbation in the grating, and can therefore improve sensing since the phase shift is determined directly from the modulation of the light, without the need to determine a time-domain response of the signal.

The modulation phase shifts can be determined by processing system 60 using any technique known in the art. A representative example of a suitable technique for determining a phase shift is provided in the Example section that follows (see Example 2). Alternatively, or additionally, signal processing system 60 can comprise a network analyzer and/or a spectrum analyzer. When processing system 60 comprises a network analyzer, it can serve both for processing the electrical signals provided by detector array 58 to determine the phase shifts, and for generating the modulation signal that is received by light source 36 or modulator 38. Thus, the same network analyzer can serve both as controller 42 and as signal processing system 60.

In embodiments in which the fiber has a plurality of gratings and modulation scanning is employed, the individual phase, wavelength or frequency shift caused by each of gratings can be determined from the information provided by the multiplicity of modulation frequencies. In these embodiments, the method preferably measures, for each modulation frequency, the global phase shift and global magnitude of the reflected light. This provides a plurality of global phase shifts and a plurality of global magnitudes. Each global phase shift and global magnitude describes a wave formed of a plurality of partial waves, respectively corresponding to the plurality of gratings in the fiber. Thus, each global phase shift and global magnitude carries information regarding the individual phase, wavelength or frequency shifts caused by the gratings in the fiber. According to some embodiments of the present invention the number of different modulation frequencies that are employed is sufficient to extract the individual phase, wavelength or frequency shifts, and optionally also the individual magnitudes, from the global phase shifts and global magnitude. This can be done, for example, by solving a set of equations, where the unknowns are the individual phase, wavelength or frequency shifts, and the coefficients and known terms are the global phase shifts and global magnitudes. It was found by the Inventors, that for a fiber having N gratings, it is sufficient to employ N/2 different modulation frequencies. Representative example of a set of equations and a technique for automatically solve these equations is provided in the Examples section that follows (see Example. 3).

In embodiments in which the fiber has a plurality of gratings and dispersion scanning is employed, the individual phase, wavelength or frequency shift caused by each of gratings can be determined from the information provided by the multiplicity of dispersion coefficient values. In these embodiments, the method preferably measures, for each dispersion coefficient value, the global phase shift and global magnitude of the reflected light. This provides a plurality of global phase shifts and a plurality of global magnitudes, as further detailed hereinabove. According to some embodiments of the present invention the number of different dispersion coefficients that are employed is sufficient to extract the individual phase, wavelength or frequency shifts, and optionally also the individual magnitudes, from the global phase shifts and global magnitude. This can be done, for example, by solving a set of equations, as further detailed hereinabove, and exemplified below.

In some embodiments of the present invention, system 60 also receives a signal from a reference light detector 62. Reference light detector 62 can receive a light beam that is reflected off the grating(s) but is not subjected to further dispersion and/or de-multiplexing. For example, a beam splitter 57 can be placed on the optical path of the light beam exiting fiber 44 such that one beam continues as further detailed hereinabove and another beam, serving as a reference beam, is directed to detector 62.

From 19 the method can proceed to 20 at which the perturbation of the grating is determined based on the phase shifts. For example, suppose that system 40 provides a light beam that is sinusoidally modulated according to $\cos(\Omega t)$, where $\Omega$ is the angular modulation frequency (e.g., within a radiofrequency range). Dispersive optical device 54 disperses the light so that each component arrives separately into optical de-multiplexing system 56. Suppose further that when fiber 44 is unperturbed, the light component reflected from the ith grating exits dispersive optical device 54 acquiring an overall modulation phase $\phi_i$, so that it is modulated according $\cos(\Omega t + \phi_i)$. System 56 directs each component into a separate channel, wherein the light component reflected from the ith grating is directed to the ith optical channel. The respective optical detector converts the ith optical channel into an electrical signal that is in turn processed by signal processing system 60 to determine its modulation parameters.

Suppose now that a perturbation occurs at the ith grating so that it selectively reflects light component at wavelength $\lambda_i + \Delta\lambda_i$, where $\lambda_i$ is the wavelength (within the optical range) of the light component that would have been reflected from the ith grating had this grating been unperturbed. Following the dispersion by dispersive optical device 54, the ith component acquires a modulation phase $\phi_i + \Delta\phi_i$ so that it is modulated according $\cos(\Omega t + \phi_i + \Delta\phi_i)$. Thus, the optical phase shift $\Delta\phi_i$ in the modulation is a proxy to the optical wavelength shift $\Delta\lambda_i$ (or, equivalently, an optical frequency shift $\Delta f_i = c\Delta\lambda_i/\lambda_i^2$, where c is the speed of light).

When de-multiplexing system 56 is employed, de-multiplexing system 56 directs this component into the ith optical channel, the respective optical detector converts this component into an electrical signal received by signal processing system 60. When signal processing system 60 determined that the phase of the signal generated by the ith detector is shifted, the method determines that perturbation occurred at the ith grating.

Alternatively, signal processing system 60 can determine the value of the optical wavelength shift $\Delta\lambda_i$ without de-multiplexing and without measuring its modulation phase shift proxy, for example, by employing modulation scanning as described herein. When signal processing system 60 determined that $\Delta\lambda_i$ is non-zero the method determines that perturbation occurred at the ith grating.

Thus, the method and system optionally and preferably successfully determine the perturbation based on the phase shift, without relying on the optical power of the reflected light beam. This is unlike conventional techniques that require complicated optical power processing operations in order to determine the perturbation.

The perturbation as determined at 20 can be expressed in more than one way. In some embodiments, the perturbation is expressed as a shift in the respective Bragg wavelength ($\Delta\lambda_i$, in the above example). The Bragg shift can be determined, for example, using an empirically generated lookup table that relates between the modulation phase shift $\Delta\phi_i$ and the Bragg shift $\Delta\lambda_i$. From the expressed value of the Bragg shift the method can determine a value of a physical quantity effecting the perturbation of the grating, for example, as known in the art of FBG sensors.

Also contemplated are embodiments in which the perturbation is expressed as the value of the physical quantity without actually determining the Bragg shift. The value of the physical quantity can be determined using an empirically generated lookup table that relates between the modulation phase shift and the value of the physical quantity.

Representative examples of physical quantities that can be determined include, without limitation, ambient temperature, pressure applied to the fiber, strain of the fiber, accelerative motion of the fiber (e.g., vibration). Another physical quantity that is contemplated is a depth of the respective grating that can be determined based on the pressure applied thereto.

The present Inventors found that the resolution of the sensing of the Bragg shift (hence also of the value the physical quantity to be determined) can be improved by a judicious selection of the frequency of the modulation and/or the resolution of the measurement of the modulation phase shift. Specifically, denoting the resolution of the measurement of the modulation phase shift by $\Delta\varphi_{res}$, the dispersion parameter that characterizes the dispersion by $\check{D}$, and the modulation angular frequency by $\Omega$, at least one of $\Omega$, $\Delta\varphi_{res}$ and $\check{D}$ is preferably selected to satisfy the relation: $\Delta\varphi_{res}/(\check{D}\times\Omega) \leq \Delta\lambda_{res}$, where $\Delta\lambda_{res}$ is a predetermined spectral resolution threshold. For example, for a signal processing system 60 capable of measuring the phase at a phase of resolution of $\Delta\varphi_{res}$, and dispersive optical device 54 capable of effecting dispersion characterized by a dispersion coefficient the dispersion parameter of $\check{D}$, controller 42 can be configured to generate a modulation signal characterized by an angular modulation frequency $\Omega$ which is at least $\Delta\varphi_{res}/(\check{D}\times\Delta\lambda_{res})$.

Typically, but not necessarily, $\Delta\lambda_{res}$ is less than 10 picometers or less than 1 picometers or less than 0.1 picometers or less than 0.05 picometers, e.g., 0.01 or less.

The Inventors found that the improvement in the spectral resolution $\Delta\lambda_{res}$ (hence also the improvement in the ability to determine the value the physical quantity) can be achieved without or with small compromise on the speed of the measurement. The speed of the measurement is typically expressed in terms of the sampling rate employed by signal processing system 60 in determining the modulation phase shifts. According to some preferred embodiments of the present invention at least one of $\Omega$, $\Delta\varphi_{res}$ and $\check{D}$ is selected to provide spectral resolution of $\Delta\lambda_{res}$ that less than 0.1 picometer or less than 0.05 picometers, e.g., 0.01 or less, at a sampling rate signal processing system 60 that is at least 1 kHz or at least 10 kHz or at least 100 kHz or at least 1 MHz or at least 10 MHz.

The method ends at 21.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Experimental Study

This Example demonstrates a high speed and high sensitivity FBG interrogator based on radio frequency (RF) phase-shift measurement. Using a sinusoidally modulated source and a chromatic dispersion element, Bragg-wavelength shifts are converted directly to RF phase shifts. Interrogation speeds of more than 1 MHz with spectral sensitivity of less than 1 pm, and sensitivity of less than 0.01 pm at speed of 100 Hz are demonstrated. The excellent resolution-speed tradeoff is demonstrated over a speed range of 5 orders of magnitude. An overall sensitivity vs. speed dependence of 0.34 fm/√Hz, which is equivalent to 0.3 nanostrain/√Hz, is demonstrated. This Example uses direct RF phase-shift measurements as the basis for the interrogation of wavelength shifts in an FBG sensor. The unique potential of this method for achieving an excellent resolution-speed tradeoff, e.g. 10 MHz speed with 1 pm spectral resolution, is demonstrated.

A light source is modulated by a sinusoidal RF signal at frequency $f_{mod}=\Omega/2\pi$ and modulation index m, giving a power:

$$P(t)=P_0[1+m\cos(\Omega t)]=P_0+P_{AC}(t) \quad (1)$$

where $P_0$ and $P_{AC}(t)$ are the average power and signal envelope respectively. After passing through a dispersive medium with a dispersion coefficient D [ps/nm/km] and length L, the signal acquires a group delay $\tau_g$, which can be expressed as an additional phase φ in the AC term:

$$P_{AC,out}(t)=P_0\cos\lfloor\Omega(t-\tau_g)\rfloor=P_0\cos(\Omega t-\varphi) \quad (2)$$

Since the group delay is dependent on the carrier wavelength, a slight shift Δλ of the center wavelength will cause a shift in the RF phase Δφ, which can be approximately expressed as:

$$\Delta\varphi\approx\Omega\check{D}\Delta\lambda \quad (3)$$

By measuring Δφ, Δλ is determined. The minimum detectable phase-shift $\Delta\varphi_{res}$ is limited by the phase-noise that accompanies the signal. Therefore, the spectral resolution is defined as:

$$\Delta\lambda_{res}=\Delta\varphi_{res}/\Omega\check{D} \quad (4)$$

so that the spectral resolution improves for lower values of phase-shift resolution, higher RF modulation frequency and higher dispersion.

Figure 3:
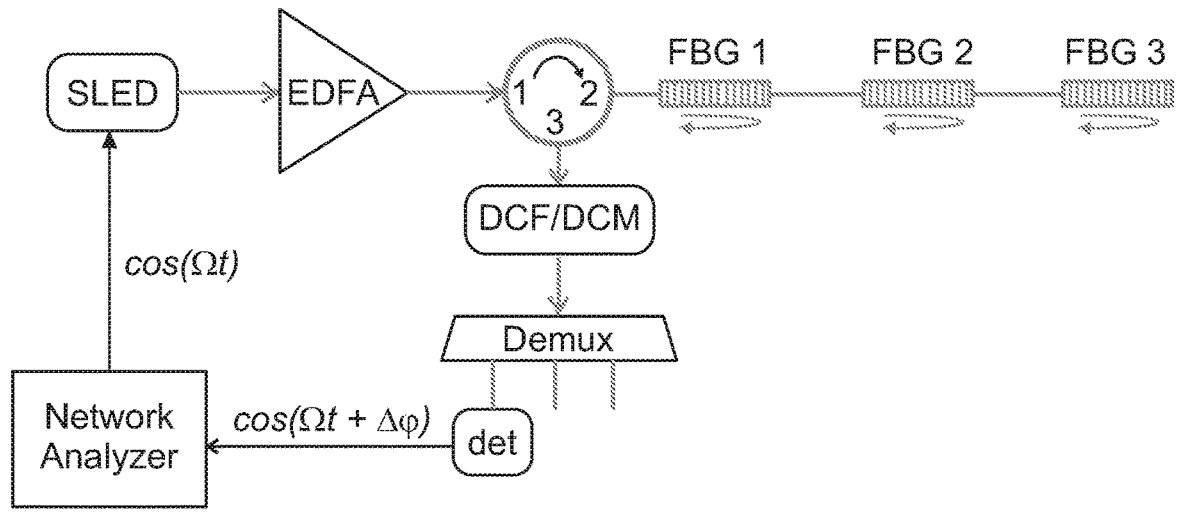
FIG. 3 is a schematic illustration of an experimental setup used in experiments performed according to some embodiments of the present invention.

The experimental setup used in this demonstration is illustrated in FIG. 3. A superluminescent diode (SLED) in the c-band was directly modulated with an RF signal of a vector network analyzer (VNA) having a tunable RF filter. In the present example, the modulation frequency was $f_{mod}$=923 MHz. The modulated light was amplified by an EDFA and directed with a circulator into a sensing channel having three FBGs with different Bragg wavelengths. The reflected light was directed into a dispersion component, which was either a dispersion compensating module (DCM) consisting of a circulator and a chirped FBG (Teraxion DCML-00100-160k) having a dispersion parameter $\check{D}$=-2680 ps/nm (used for the first three experiments described below), or a dispersion compensating fiber (DCF) a dispersion parameter with DL=-680 ps/nm (used for a portion of the fourth experiment described below). A demultiplexer split the light into three spectral regimes corresponding to the Bragg wavelengths of the three FBGs, and the detected signals were then routed back to the VNA for RF phase-shift measurement. The average detected optical power was approximately -16 dBm.

Figure 4:
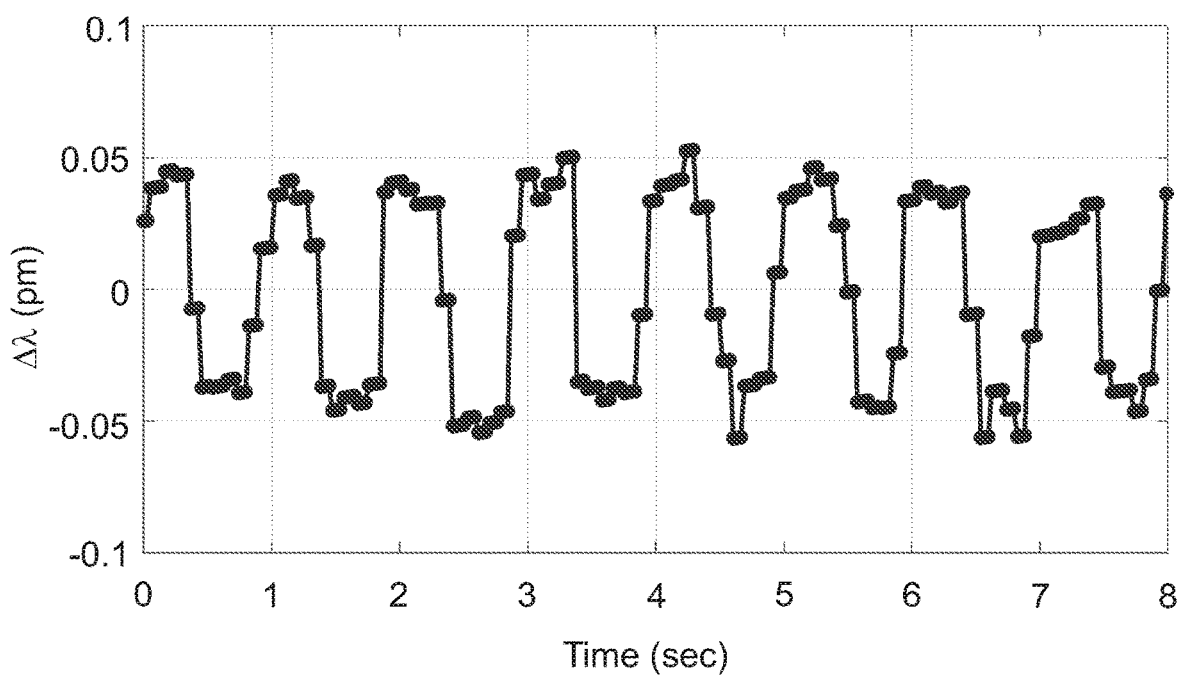
FIG. 4 shows monitored Bragg wavelength shift due to periodic strain on a FBG, obtained in experiments performed according to some embodiments of the present invention.

In a first experiment, the system's performance with weak strain was demonstrated. One of the FBGs was periodically strained with a motorized high-precision mechanical stage at a frequency of approximately 1 Hz, and the signal was sampled at a rate of 10 Hz. The pk-pk strain on the FBG was approximately 0.09με, giving a spectral shift of about 0.1 pm in the Bragg wavelength. The output signal is shown in FIG. 4, demonstrating the capability of the system of the present embodiments to acquire weak strain signals with good SNR. The shown resolution capability is below 0.1 pm. In this experiment, the intermediate frequency bandwidth ($IF_{BW}$) of the VNA was set to $IF_{BW}$=10 Hz, allowing a speed acquisition of approximately 10 samples per second, since the sampling rate of the VNA is proportional to the $IF_{BW}$.

Figure 5:
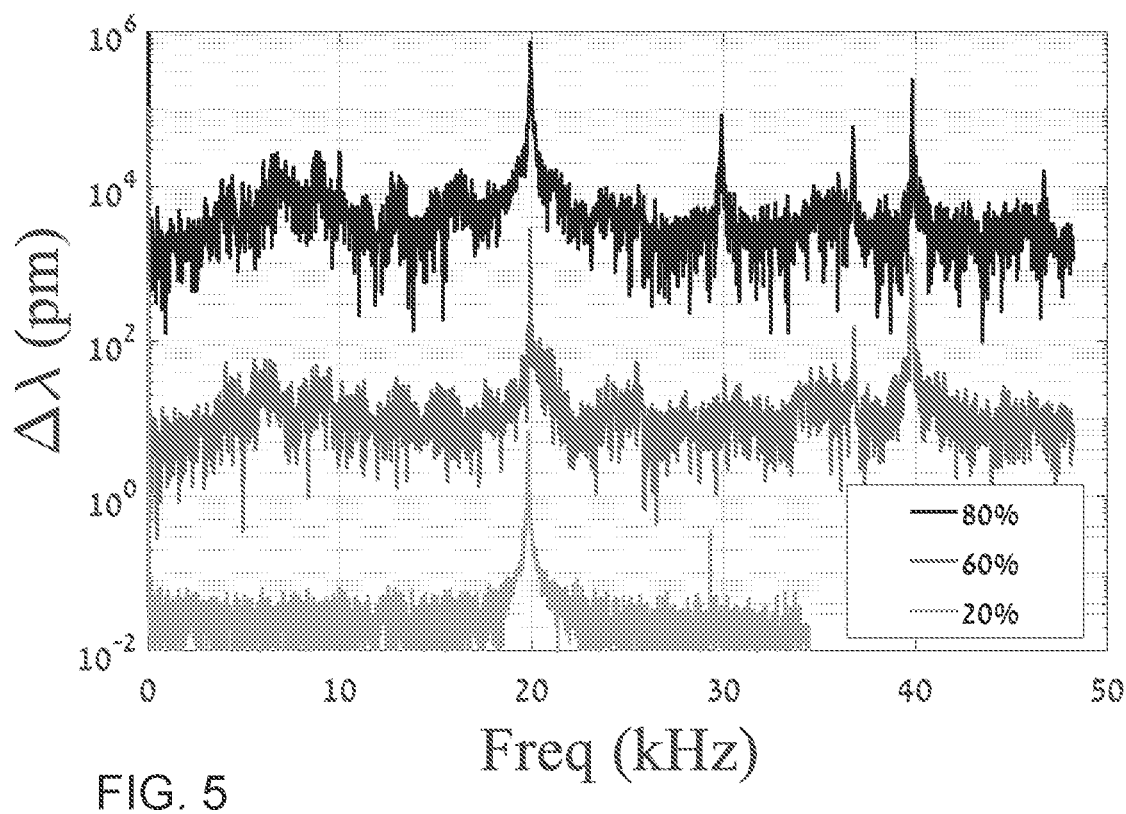
FIG. 5 shows Fourier analysis of ultrasonic waves in water for different values of vibration power, obtained in experiments performed according to some embodiments of the present invention.

A second experiment demonstrated the system response in an ultrasonic region between 20-100 kHz. A second FBG was immersed in a water-filled container, together with an ultrasonic probe (Sonics Vibra-Cell) which gives a fixed vibration at 20 kHz. The Fast Fourier transform (FFT) of the acquired signal is shown in FIG. 5 for three different values of the ultrasonic-wave intensity. In FIG. 5, the green line corresponds to 20% ultrasonic power, the red line corresponds to 60% ultrasonic power, and the black line corresponds to 80% ultrasonic power. The red and black lines are offset for clarity. Note that as the intensity increases, the second harmonic at 40 kHz appears, and for higher intensity, other frequencies appear, due to the nonlinearity of the probe. The y-axis wavelength-shift values (Δλ) refer only to the low intensity level experiment (20%), the others are at the same scale, but shifted for clarity. The speed acquisition was about 70 kHz for the low level experiment and about 96 kHz for the higher levels, in order to record the higher harmonic vibrations.

Figure 6:
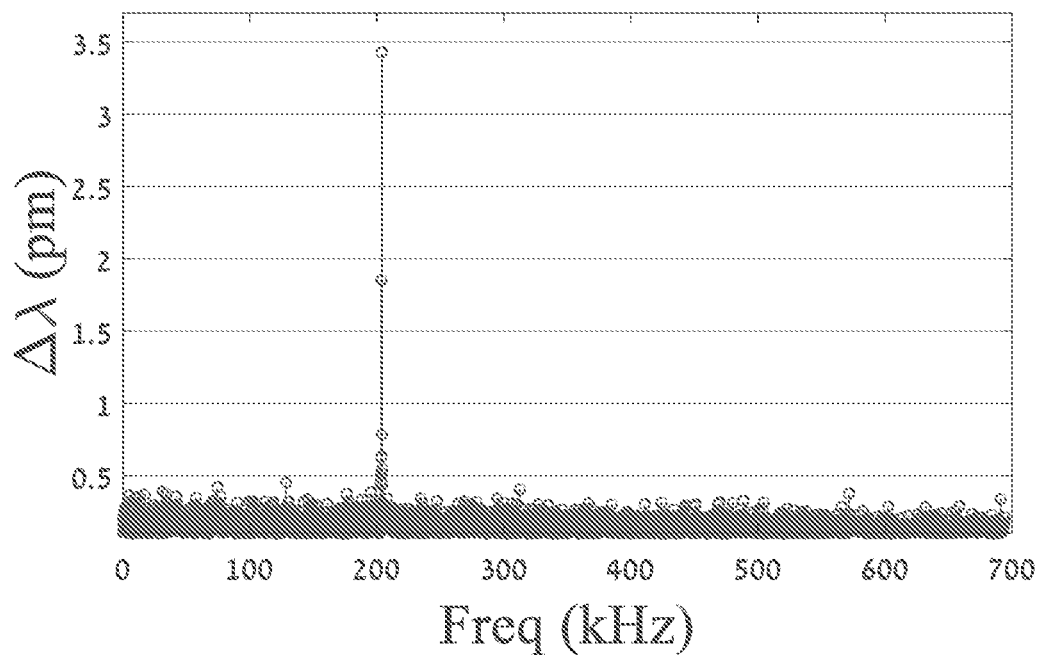
FIG. 6 shows Fourier analysis of a signal returning from an FBG wound around a piezoelectric fiber stretcher vibrating at about 200 kHz.

FIG. 6 shows the results of a third experiment, where a third FBG was wound around a piezoelectric fiber stretcher (Optiphase) driven by a sinusoidal signal at 200 kHz. The acquisition speed was set at about 1.4 MHz. A graph of the signal FFT shows the 200 kHz peak, corresponding to am about 3.5 pm shift in the Bragg wavelength, with an SNR of about 7.

Throughout these experiments there no cross-talk between the RF signals of the different FBG reflections was observed, enabling a clean detection of each FBG sensor.

In a fourth experiment, consisted of four different runs, the overall dependence of the system resolution on the $IF_{BW}$ (which limits the speed of the measurement) was characterized for different values of the $\check{D}$ parameter and/or modulation frequency $f_{mod}$. In each experimental run, the $IF_{BW}$ of the VNA was gradually increased and the minimum (SNR=1) wavelength-shift resolution was measured, using the same third FBG used in the third experiment. The results are plotted in FIG. 7. In the first run, a standard dispersion compensating fiber (DCF) with $\check{D}$=-680 ps/nm was used (blue dots in FIG. 7). In the second run the DCF was replaced with the DCM used above ($\check{D}$=-2680 ps/nm, red dots in FIG. 7). For both runs $f_{mod}$ was 133 MHz. In the third and fourth runs, the DCM remained, and the modulation frequency was first increased to 913 MHz (green dots in FIG. 7) and then decreased to 635 MHz (black dots in FIG. 7). In the present Example, this latter frequency was preferred, giving 17 dB more RF power. The solid lines in FIG. 7 are fits to a resolution that is proportional to the square root of the speed.

Figure 7:
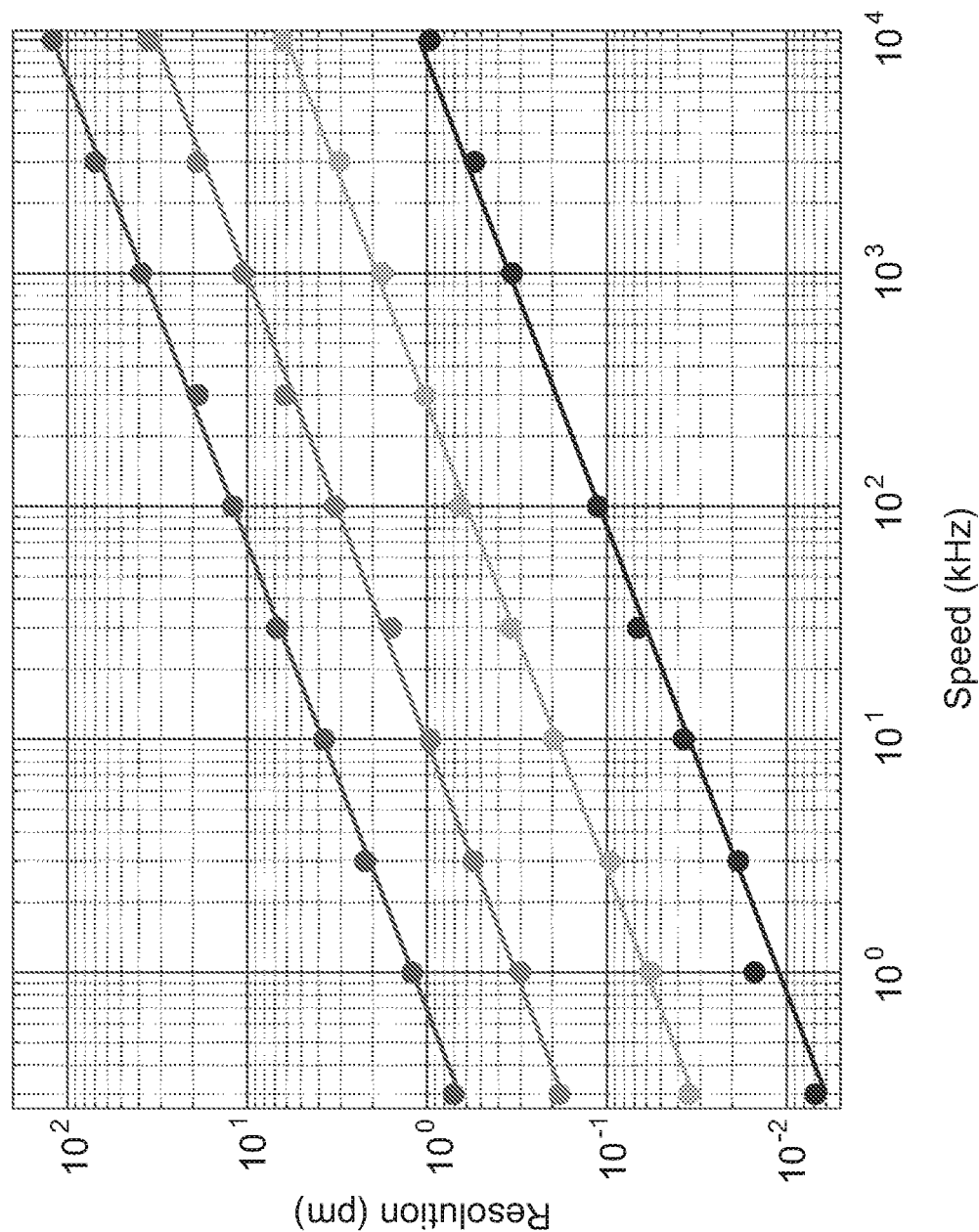
FIG. 7 shows resolution as a function of speed, obtained in experiments performed according to some embodiments of the present invention.

As demonstrated in FIG. 7 that for any given dispersion parameter $\check{D}$ and modulation frequency, the trade-off between speed and sensitivity depends only on the $IF_{BW}$. Increasing the dispersion coefficient by a factor of 4, for example, by replacing the DCF (blue line) with the DCM (red line), improves the all-over performance by the same factor as predicted by EQ. 4. Increasing $f_{mod}$ by a factor of 8 (red line to green line) improved the sensitivity by a lower factor of 5.3. It is assumed that this is due to a combination of increased phase noise with increasing frequency as well as the combined RF dependence of the system's various components. This is borne out from the final run at 635 MHz (black line) where the system performance peaked due to the overall RF response of the system. This suggests that the performances described in this Example can be enhanced even further.

This Example demonstrates an overall sensitivity vs. speed dependence of about 0.34 fm/√Hz, which in terms of strain measurement is equivalent to 0.3 n∈/√Hz. These results outperform conventional FBG interrogators. The technique of the present embodiments is robust and can be used for dynamic measurements as well as for quasi-static monitoring without the need for additional compensation techniques which increase cost and complexity. Due to its reliance on frequency domain measurements and electronic RF processing, the technique of the present embodiments is more flexible than conventional methods, particularly those that relay on time-domain measurements. This Example demonstrates that the operating point can be selected anywhere in the region between ultra-high sensitivity or ultra-high speed, by adjusting the RF filter bandwidth or other equivalent signal processing parameters.

The spectral dynamic range (ratio between spectral bandwidth and resolution) of the exemplified technique is about 35 dB for phase resolution of 2 mrad, within the $2\pi$ phase ambiguity constraint. As for the measurable wavelength range, the flexibility of the technique of the present embodiments is an advantage, since decreasing the modulation frequency decreases the wavelength-shift to phase-shift ratio (see EQ. 3), allowing for large wavelength range measurements. The phase can in some embodiments of the present invention be unwrapped by digital signal processing if the sampling rate is at least twice as fast as the signal measurement speed, enabling an increase of the dynamic range. The large spectral dynamic range and flexible wavelength range measurement, allow for high-speed and high-resolution interrogation. Another advantage of the exemplified technique is that fluctuations of the source power do not affect the measurement. This feature is particularly useful for amplified spontaneous emission (ASE) light sources such as an as SLED, where the broadband spectrum appears to be stable over a long time scale, but fluctuates at RF time scales.

A further advantage of the technique of the present embodiments is the ability to simultaneously interrogate cascaded FBG sensors by routing the different spectral regions of each FBG sensor to different detectors (for example, using a demultiplexer) and measuring all the phase-shifts in parallel. This capability is particularly useful for applications such as machine condition monitoring, especially at MHz sampling rates.

Example 2

Exemplified Phase Shift Measurement

Figure 8:
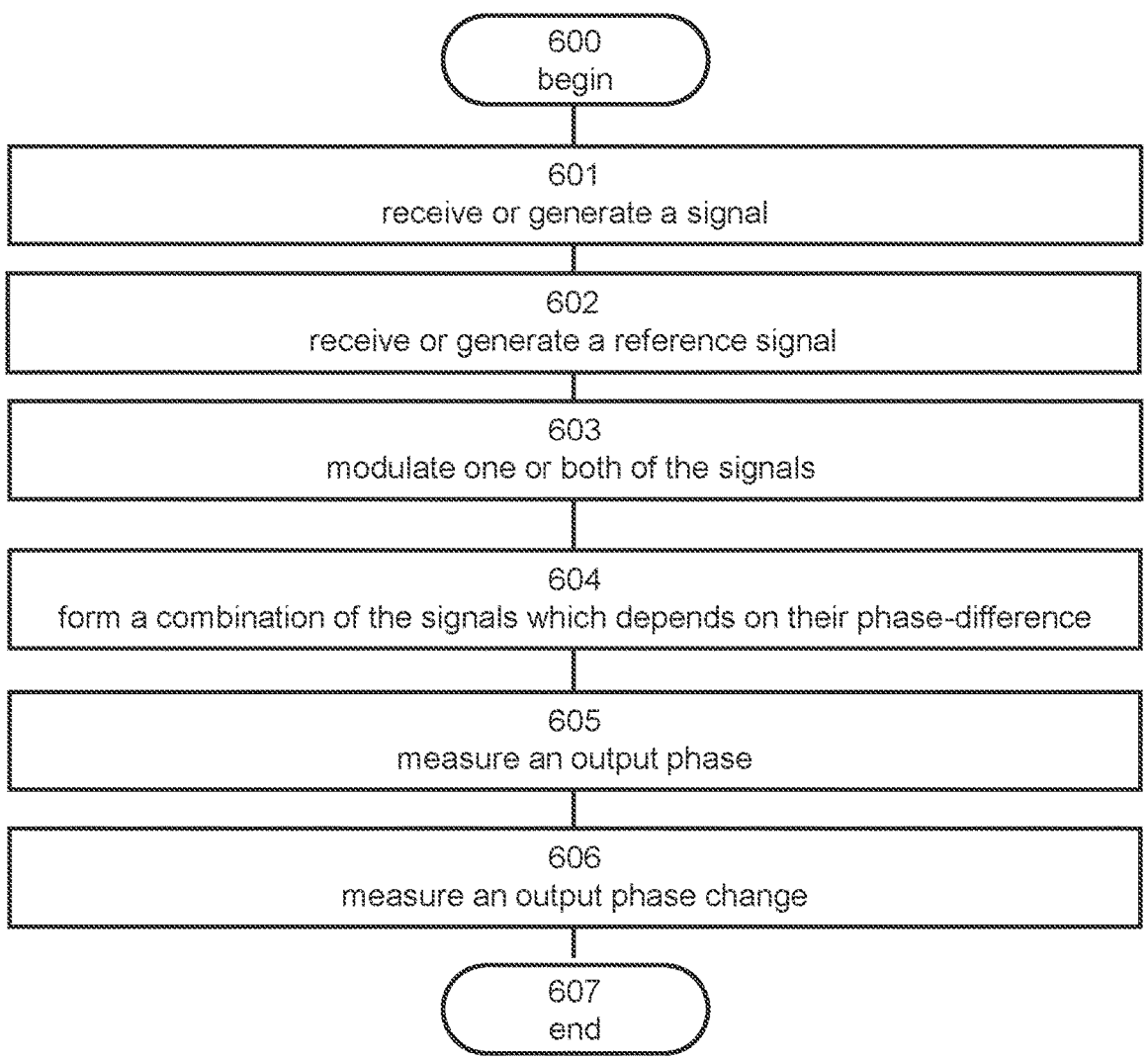
FIG. 8 is a flowchart diagram of a method suitable for amplifying a phase shift, according to some embodiments of the present invention.

FIG. 8 is a flowchart diagram of a method suitable for amplifying a phase shift of a signal relative to a reference signal, according to some embodiments of the present invention. The method is suitable for improving the resolution of phase shift measurement. The phase shift can be amplified by a predetermined factor to a value that is within the detection resolution of a phase shift detector. The amplified phase shift can then be measured by the phase shift detector as known in the art, and the result of the measurement can be divided by the predetermined factor, thereby allowing the determination of the unamplified phase shift even if its extent is less than the available resolution of the phase shift detector.

The method begins at 600 and continues to 601 at which a signal S is generated or received, and to 602 at which a reference signal $S_{ref}$ is generated or received. For example, one of the signals (e.g., signal S) can be the signal reflected off the grating(s) in the fiber of the present embodiments, and the other signal (e.g., signal $S_{ref}$) can be received via a path that does not allow it to interact with the grating(s). The method continues to 603 at which the modulation of at least one of the signals is varied. The variation is optionally and preferably with respect to the modulation amplitude such that the modulation amplitudes of the signal and the reference signal are sufficiently close to each other. Preferably, a ratio between modulation amplitudes of the signal and the reference signal is from about 0.9 to about 1.1, or from about 0.95 to about 1.05, or from about 0.99 to about 1.01, or from about 0.995 to about 1.005, or from about 0.999 to about 1.001 or from about 0.9995 to about 1.0005 or from about 0.9999 to about 1.0001. The variation is optionally and preferably also with respect to the modulation phase, such that such that the phase difference $\theta_{in}$ between the phase $\theta_1$ of the reference signal and the phase $\theta_2$ of the signal is sufficiently small or sufficiently close to $\pi$ radians, as further detailed hereinabove. Optionally, one of signals S and $S_{ref}$ is generated by selected operations of method 100 so as to ensure that the phase difference $\theta_{in}$ is sufficiently small or sufficiently close to $\pi$ radians. The amplitude(s) and phase(s) employed for the modulation variation can be selected by the method or be stored or encoded in a circuit that vary the modulation.

The method preferably continues to 604 at which an output signal $S_{out}$ which is a linear combination of the signals is formed. This can be done electronically, using an electric circuit, or optically using an optical assembly. The combination 604 can be done either directly, for example, using a signal summing circuit, or indirectly, for example, by signal multiplication followed by extraction of signal components that are linearly proportional to each of the signals, as further detailed hereinabove.

The linear combination can be generally written as $S_{out}=p(S+qS_{ref})$, where p is a normalization parameter, q is a linear combination coefficient and S and $S_{ref}$ are, respectively, the signal and reference signal following the modulation variation 603. The normalization parameter p can be set to any number, e.g., 1. The linear combination coefficient reflects the weight ratio of the two signal and is optionally and preferably selected based on the sign of $\cos(\theta_{in})$, where $\theta_{in}$ is the phase difference between the modulation phases of the signals.

Generally, q is about 1 when $\cos(\theta_{in})$ is negative and about −1 when $\cos(\theta_{in})$ is positive. This can be written mathematically as $q \approx -\text{NINT}(\cos(\theta_{in}))$, where NINT is the nearest integer function and the sign is to be understood as within 10%. In other words, q optionally and preferably satisfies the conditions $\text{sign}(q)=-\text{sign}(\cos(\theta_{in}))$ and $0.9 \leq |q| \leq 1.1$.

It was found by the present Inventors that the above procedure can ensure that the phase difference of the output signal relative to the reference ($\theta_{out}-\theta_1$) is amplified relative to the phase difference $\theta_{in}$. It was found that the amplification extent can reach the value of $1/\alpha$, where $\alpha$ is the absolute value of the difference between 1 and the ratio between modulation amplitudes of the signals. According to some embodiments of the present invention a can be at most 0.1 or at most 0.05 or at most 0.01 or at most 0.005 or at most 0.0001 or less, so that $\theta_{out}$ can be 10 times larger or 20 times larger or 100 times larger or 200 times larger or 1000 times larger or 2000 times larger or 10000 times larger than $\theta_{in}$, where $\theta_{out}$ is the phase of $S_{out}$.

In some embodiments of the present invention the method continues to 605 at which the phase of the output signal relative to the reference signal is measured. This can be done using any phase measuring technique known in the art. Representative examples including, without limitation, phase detectors that are commercially available from Mini-Circuits®, USA, and On Semiconductors®, USA.

In some embodiments of the present invention, the method continues to 606 at which a change over time of the phase of the output signal relative to the reference signal is measured. Operation 606 can be executed whether or not the phase of the output signal is known, since a change in a phase of a signal can be measured even when the signal's phase itself is not known. Thus, in some embodiments 605 is executed and 606 is not executed, in some embodiments both 605 and 606 are executed, in some embodiments 605 is not executed and 606 is executed, and in some embodiments none of 605 and 606 is executed.

The method ends at 607.

Once the change of the phase is measured, it can be multiplied by a to determine the unamplified phase shift.

Figure 9:
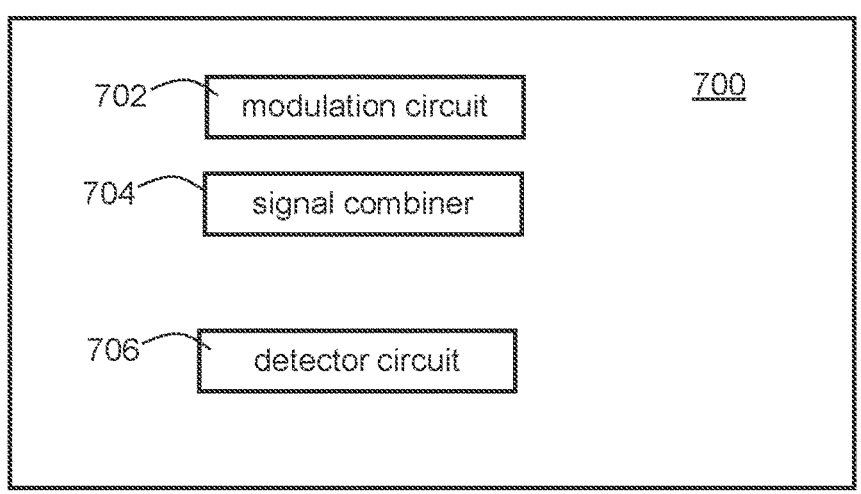
FIG. 9 is a schematic block diagram illustration of a system for amplifying a phase shift, according to some embodiments of the present invention.

FIG. 9 is a schematic block diagram illustration of a system 700 for amplifying a phase shift of a signal relative to a reference signal, according to some embodiments of the present invention. System 700 is optionally and preferably configured for executing one or more operations of method 600 above. System 700 comprises a modulation circuit 702, configured for varying a modulation of at least one of the signals as further detailed hereinabove. The amplitude(s) and phase(s) employed for the modulation variation performed by circuit 702 can be selected by system 700, for example, using an amplitude selection circuit, or be stored or encoded in circuit 702.

System 700 can also comprise a signal combiner 704, configured for forming an output signal $S_{out}$ which is a linear combination of the signals, as further detailed hereinabove. In some embodiments, combiner 704 comprises a signal adder circuit. These embodiments are useful when the linear combination coefficient is positive (e.g., q=1). In some embodiments, combiner 704 comprises a signal subtractor circuit. These embodiments are useful when the linear combination coefficient is negative (e.g., q=−1). In some embodiments, combiner 704 comprises a signal multiplier circuit. These embodiments are useful when the linear combination is obtained by multiplication followed by extraction of linear components as further detailed hereinabove.

In some embodiment combiner 704 is an optical assembly configured for performing a linear combination of two signals as known in the art.

In some embodiments of the present invention, system 700 comprises a detector circuit 706, which can be configured as phase detector for measuring a phase of the output signal relative to the reference signal, or as a phase-change detector for measuring a change of phase of the output signal over time, or as a combined phase detector and phase-change detector for measuring both the phase of and its change.

Example 3

Calculation of Phase-Shifts by Solving a System of Equations

This Example describes a technique for numerically calculating the wavelength-shift caused by each grating, by scanning the modulation frequency. The advantage of this technique is that it does not need a physical element (such as a de-multiplexer) to separate between the channels. Since the light reflected off the gratings (and optionally also preferably passed through the dispersive optical device) is a summation of the different signals returning from the different gratings the total signal at the modulation frequency $\Omega$ can be written as:

$$a_1 e^{i\Delta\varphi_1} + a_2 e^{i\Delta\varphi_2} + \ldots + a_N e^{i\Delta\varphi_N} = b e^{i\xi}$$

where $a_i$ and $\Delta\varphi_i \equiv \check{D}\Omega\Delta\lambda_i$ are respectively the magnitude and the phase-shift reflected off the ith grating, and $b$ and $\xi$ are respectively the global magnitude and the global phase-shift of the total signal as measured by an optical detector having a single optical sensor.

Assuming the magnitudes $a_i$ are known from preliminary measurements, by scanning different modulation frequencies $\Omega_j$ (preferably at least N/2, where N is the number of gratings in the fiber), one can obtain a system of N equations with N unknowns (the Bragg-wavelength-shifts $\Delta\lambda_i$). The scanning can be serial or in parallel. Parallel scanning can be achieved by simultaneously modulating the RF signal with several frequencies, and measuring, e.g., by a signal processing system, each frequency by itself simultaneously, for example, using RF filters. A suitable system of N equations can be written as:

$$\sum_{i=1}^{N} a_{i,\Omega_1} \cos(\check{D}\Omega_1 \Delta\lambda_i) = b(\Omega_1)\cos(\xi(\Omega_1))$$

$$\sum_{i=1}^{N} a_{i,\Omega_1} \sin(\check{D}\Omega_1 \Delta\lambda_i) = b(\Omega_1)\sin(\xi(\Omega_1))$$

$$\sum_{i=1}^{N} a_{i,\Omega_2} \cos(\check{D}\Omega_2 \Delta\lambda_i) = b(\Omega_2)\cos(\xi(\Omega_2))$$

$$\sum_{i=1}^{N} a_{i,\Omega_2} \sin(\check{D}\Omega_2 \Delta\lambda_i) = b(\Omega_2)\sin(\xi(\Omega_2))$$

$$\ldots$$

$$\sum_{i=1}^{N} a_{i,\Omega_{N/2}} \cos(\check{D}\Omega_{N/2} \Delta\lambda_i) = b(\Omega_{N/2})\cos(\xi(\Omega_{N/2}))$$

$$\sum_{i=1}^{N} a_{i,\Omega_{N/2}} \sin(\check{D}\Omega_{N/2} \Delta\lambda_i) = b(\Omega_{N/2})\sin(\xi(\Omega_{N/2}))$$

A solution or partial solution of this system of equations can provide the values of $\Delta\lambda_i$, i=1, 2, ... N. This system of equations can be automatically solved using any technique known in the art. Representative examples include, without limitation the 'Trust-region' method [26] and the 'Levenberg-Marguardt' technique [27,28].

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

REFERENCES

1. J. Chen, B. Liu and H. Zhang, "Review of fiber Bragg grating sensor technology", Front. Optoelectron. China 4 204 (2011).
2. Y. C. Tong, L. Y. Chan and H. K. Tsang, "Fibre dispersion or pulse spectrum measurement using a sampling oscilloscope", Electronics Lett. 33(11) 983-985 (1997).
3. H. Chi and J. Yao, "Fiber chromatic dispersion measurement based on wavelength-to-time mapping using a femtosecond pulse laser and an optical comb filter," Optics Communications 280(2) 337-342 (2007).
4. Y. Wang, M. Han and A. Wang, "High-speed fiber-optic spectrometer for signal demodulation of inteferometric fiber-optic sensors," Opt. Lett. 31 2408-10 (2006).
5. H. Y. Fu, H. L. Liu, X. Dong, H. Y. Tam, P. K. A. Wai and C. Lu, "High-speed fibre Bragg grating sensor interrogation using dispersion compensation fiber," Electronics Lett. 44 (10) 618-619 (2008).
6. J. Chou, B. Jalali and D. R. Solli, "Amplified wavelength-time transformation for real-time spectroscopy, "Nature Photonics 2 (1) 48-51 (2008).
7. P. V. Kelkar, F. Coppinger, A. S. Bhushan and B. Jalali, "Time-domain optical sensing," Electronics Letters 35 (19) 1661-2 (1999).
8. J. Chou, Y. Han and B. Jalali, "Time-wavelength spectroscopy for chemical sensing. IEEE Photonics Tech. Lett. 16 (4) 1140-2 (2004).
9. G. Herink, B. Jalali, C. Ropers and D. R. Solli, "Resolving the build-up of femtosecond mode-locking with single-shot spectroscopy at 90 MHz frame rate," Nature Photonics 10 321-326 (2016).
10. J. Hervas, C. R. Fernandez-Pousa, D. Barrera, D. Pastor, S. Sales and J. Capmany, "An interrogation technique of FBG cascade sensors using wavelength to radio-frequency delay mapping," J. Lightwave. Technol. 33 (11) 2222-7 (2015).
11. J. C. Bellido and C. R. Fernandez-Pousa, "Spectral Analysis Using a Dispersive Microwave Photonics Link Based on a Broadband Chirped Fiber Bragg Grating," J. Lightwave. Technol. 33 (20) 4207-14 (2015).
12. J. Park, W. V. Sorin and K. Y. Lau, "Elimination of the fibre chromatic dispersion penalty on 1550 nm millimeter-wave optical transmission," Electronics Lett. 33 512-3 (1997).
13. B. Costa, D. Mazzoni, M. Puleo, and E. Vezzoni, "Phase shift technique for the measurement of chromatic dispersion in optical fibers using LED's," IEEE J. Quantum Electron. QE-18 (10) 1509-1515 (1982).
14. W. W. Morey, J. R. Dunphy and G. Meltz, "Multiplexing fiber Bragg grating sensors," j. Fiber and Integrated Optics 10 351-360 (1992).
15. C. Wang and J. Yao, "Ultrafast and ultrahigh-resolution interrogation of a fiber Bragg grating sensor based on interferometric temporal spectroscopy," J. Lightwave Technol. 29 (19), 2927-2933 (2011).
16. Lei, M., Zou, W., Li, X. & Chen, J. Ultrafast FBG interrogator based on time-stretch method. IEEE Photon. Technol. Lett. 28, 778-781 (2016).
17. A. Ikeda, T. Nomura, Y. H. Matsuda, S. Tani, Y. Kobayashi, H. Watanand, K. Sato, "High-speed 100 MHz strain monitor using fiber Bragg grating and optical filter for magnetostriction measurements under ultrahigh magnetic fields," Rev. Sci. Instrum. 88 083906 (2017).
18. H. Fu, W. Zhang, C. Mou, X. Shu, L. Zhang, S. He and I. Bennion, "High-Frequency Fiber Bragg Grating Sensing Interrogation System Using Sagnac-Loop-Based Microwave Photonic Filtering," IEEE Photonics tech. lett. 21 (8) 519 (2009).
19. J. Zhou, L. Xia, R. Chengy, Y. Wen and J. Rohollahnejad, "Radio-frequency unbalanced M-Z interferometer for wavelength interrogation of fiber Bragg grating sensors," Opt. Lett. 41 (2) 313-316 (2016).
20. H. Xia, C. Wang, S. Blais, and J. Yao, "Ultrafast and Precise Interrogation of Fiber Bragg Grating Sensor Based on Wavelength-to-Time Mapping Incorporating Higher Order Dispersion," J. Lightwave. Technol. 28 (3) 254-261 (2010).
21. A. D. Kersey, T. A. Berkoff and W. W. Morey, "High-resolution fiber-grating based strain sensor with interferometric wavelength-shift detection," Electronics Lett. 28 (3) 236-238 (1992).
22. X Dong, L Y Shao, H Y Fu, H Y Tam and C. Lu, "FBG sensor interrogation based on RF signal measurement," Proc. of SPIE 7004 700423 (2008).
23. J. Frieden, J. Cugnoni, J. Botsis, T. Gmür and D. Coric, "High-speed internal strain measurements in composite structures under dynamic load using embedded FBG sensors," Compos. Struct. 92 1905-1912 (2010).
24. A. A. Giordana, E. E. Sicre and R. Duchowicz, "Simple wavelength-to-phase mapping FBG's interrogation method," Optics and Lasers in Engineering 55 221-225 (2014).
25. R. D. Sante, "Fibre Optic Sensors for Structural Health Monitoring of Aircraft Composite Structures: Recent Advances and Applications," Sensors 15 18666-18713 (2015).
26. Y. Yuan, "Recent Advances in Trust Region Algorithms." Math. Program. 151 249-281 (2015).
27. K. Levenberg, "A Method for the Solution of Certain Problems in Least Squares," *Quart. Appl. Math.* 2 164-168 (1944).
28. D. Marquardt, "An Algorithm for Least-Squares Estimation of Nonlinear Parameters," *SIAM J. Appl. Math.* 11 431-441 (1963).

What is claimed is:

1. A method of determining perturbation of a grating formed in an optical fiber, the method comprising:
   modulating and transmitting a light beam through the optical fiber, dispersing light reflected off the grating, measuring at least one phase shift in a modulation of said reflected light, and determining the perturbation of the grating based on said at least one phase shift;
   wherein said dispersing is prior to said measurement of said at least one phase shift;
   wherein the optical fiber is formed with a plurality of gratings, wherein at least two of said gratings are characterized by different Bragg wavelengths, wherein said measurement of said at least one phase shift is characterized by a predetermined phase resolution, and said dispersing is characterized by a predetermined dispersion parameter describing pulse broadening per unit wavelength, and wherein a frequency of said modulating is at least a ratio between said phase resolution and a multiplication of said dispersion parameter by a predetermined spectral resolution threshold.

2. The method of claim 1, wherein said modulating is executed before said transmitting.

3. The method of claim 1, wherein said modulating is executed after said light beam is reflected off the grating.

4. The method of claim 1, wherein said modulating is executed before said transmitting as well as after said light beam is reflected off the grating.

5. The method according to claim 1, further comprising de-multiplexing said reflected light beam into at least two channels, respectively corresponding to said different Bragg wavelengths, prior to said measurement of said at least one phase shift.

6. The method according to claim 1, wherein said modulating comprises scanning a frequency of said modulation over a plurality of modulation frequencies, wherein the method comprises measuring a modulation phase shift and modulation magnitude of light reflected off said at least two gratings for each modulation frequency, and determining an individual optical wavelength or optical frequency shift for each of said at least two gratings, based on said measured modulation phase shifts and measured modulation magnitudes.

7. The method according to claim 1, wherein said dispersing is by a chirped grating formed in an optical fiber.

8. The method according to claim 1, wherein said dispersing is by an optical fiber spool.

9. The method according to claim 1, wherein said dispersing is characterized by a dispersion coefficient, wherein the method comprises varying a value of said coefficient over a plurality of dispersion coefficient values, measuring a modulation phase shift and modulation magnitude of light reflected off the grating for each value of said dispersion coefficient, and determining an individual optical wavelength or optical frequency shift for each of said at least two gratings, based on said measured modulation phase shifts and measured modulation magnitudes.

10. The method according to claim 1, wherein said modulating comprises radiofrequency modulation.

11. The method according to claim 1, wherein said modulating comprises sinusoidal modulation.

12. The method of claim 1, further comprising amplifying said light beam prior to said transmission.

13. The method according to claim 1, wherein said determination of the perturbation of the grating is not on an optical power of said reflected light beam.

14. The method according to claim 1, being executed without determining an optical power of said reflected light beam.

15. The method according to claim 1, wherein said determination of the perturbation of the grating comprises expressing the perturbation as a shift in a Bragg wavelength characterizing the grating.

16. The method according to claim 15, further comprising using said shift in said Bragg wavelength for calculating at least one physical quantity effecting the perturbation of the grating.

17. The method according to claim 16, wherein said at least one physical quantity is selected from the group consisting of ambient temperature, pressure applied to the fiber, strain of the fiber, and accelerative motion of the fiber.

18. The method according to claim 1, wherein said determination of the perturbation of the grating comprises expressing the perturbation as at least one physical quantity effecting the perturbation of the grating.

19. A system for determining perturbation of a grating formed in an optical fiber, the system comprising:
an optical modulation system for modulating a light beam;
an optical coupler for coupling said light beam into the optical fiber and receiving light reflected off the grating; and
an optical and electrical analysis system configured for measuring at least one phase shift in a modulation of light reflected off the grating, and determining the perturbation of said grating based on said at least one phase shift;
wherein said optical and electrical analysis system comprises:
a dispersive optical device configured for dispersing said reflected light beam prior to said measurement of said at least one phase shift; and
a signal processing system configured for measuring said at least one phase shift at a predetermined phase resolution, wherein said dispersive optical device is configured for effecting dispersing according to a predetermined dispersion parameter describing pulse broadening per unit wavelength, and wherein said optical modulation system is configured for modulating said light beam at a frequency which is at least a ratio between said phase resolution and a multiplication of said dispersion parameter by a predetermined spectral resolution threshold.

20. The system according to claim 19, wherein said optical modulation system is configured to modulate said light beam before said transmission.

21. The system according to claim 19, wherein said optical modulation system is configured to modulate said light beam after said light beam is reflected off the grating.

22. The system according to claim 19, wherein said optical modulation system is configured to modulate said light beam before said transmitting as well as after said light beam is reflected off the grating.

23. A sensor system, comprising:
an optical modulation system for modulating a light beam;
an optical coupler for coupling said light beam into a fiber formed with a grating and receiving light reflected off the grating; and
an optical and electrical analysis system configured for measuring at least one phase shift in a modulation of light reflected off the grating, and determining at least one physical quantity effecting a perturbation of said grating;
wherein said optical and electrical analysis system comprises:
a dispersive optical device configured for dispersing said reflected light beam prior to said measurement of said at least one phase shift; and
a signal processing system configured for measuring said at least one phase shift at a predetermined phase resolution, wherein said dispersive optical device is configured for effecting dispersing according to a predetermined dispersion parameter describing pulse broadening per unit wavelength, and wherein said optical modulation system is configured for modulating said light beam at a frequency which is at least a ratio between said phase resolution and a multiplication of said dispersion parameter by a predetermined spectral resolution threshold.

24. The system according to claim 23, wherein said at least one physical quantity is selected from the group consisting of ambient temperature, pressure applied to said fiber, strain of said fiber, and accelerative motion of said fiber.

25. A method of determining perturbation of a plurality of gratings formed in an optical fiber, the method comprising:
modulating and transmitting a light beam through the optical fiber, wherein said modulating comprises scanning a frequency of said modulation over a plurality of modulation frequencies;
dispersing light reflected off the gratings;
measuring a modulation phase shift and modulation magnitude of said reflected light for each modulation frequency; and
determining perturbation of at least two of the gratings based on said measured modulation phase shifts and measured modulation magnitudes;
wherein said dispersing is prior to said measurement of said at least one phase shift;
wherein at least two of said gratings are characterized by different Bragg wavelengths, wherein said measurement of said at least one phase shift is characterized by a predetermined phase resolution, and said dispersing is characterized by a predetermined dispersion parameter describing pulse broadening per unit wavelength, and wherein a frequency of said modulating is at least a ratio between said phase resolution and a multiplication of said dispersion parameter by a predetermined spectral resolution threshold.

26. The method of claim 25, further comprising dispersing said light reflected off the grating using a controllable dispersive optical device, wherein said dispersing comprises controlling said dispersive optical device so as to vary a value of a dispersion coefficient characterizing said dispersive optical device, wherein the method comprises measuring said modulation phase shift and modulation magnitude also for different values of said dispersion coefficient.

27. A method of determining perturbation of a grating formed in an optical fiber, the method comprising:
modulating and transmitting a light beam through the optical fiber, dispersing light reflected off the grating, measuring at least one phase shift in a modulation of said reflected light, and determining the perturbation of the grating based on said at least one phase shift;
wherein said reflected light beam prior to said measurement of said at least one phase shift;
wherein the optical fiber is formed with a plurality of gratings, wherein at least two of said gratings are characterized by different Bragg wavelengths, wherein said dispersing is characterized by a dispersion coefficient, wherein the method comprises varying a value of said coefficient over a plurality of dispersion coefficient values, measuring a modulation phase shift and modulation magnitude of light reflected off the grating for each value of said dispersion coefficient, and determining an individual optical wavelength or optical frequency shift for each of said at least two gratings, based on said measured modulation phase shifts and measured modulation magnitudes.

28. A system for determining perturbation of a grating formed in an optical fiber, the system comprising:
an optical modulation system for modulating a light beam;
an optical coupler for coupling said light beam into the optical fiber and receiving light reflected off the grating; and
an optical and electrical analysis system configured for measuring at least one phase shift in a modulation of light reflected off the grating, and determining the perturbation of said grating based on said at least one phase shift;
wherein the optical fiber is formed with a plurality of gratings, wherein at least two of said gratings are characterized by different Bragg wavelengths;
wherein said optical and electrical analysis system comprises a dispersive optical device configured for dispersing said reflected light beam prior to said measurement of said at least one phase shift, wherein said dispersing is characterized by a dispersion coefficient, wherein a value of said coefficient is varied over a plurality of dispersion coefficient values; and
wherein said optical and electrical analysis system is configured for measuring a modulation phase shift and modulation magnitude of light reflected off the grating for each value of said dispersion coefficient, and determining an individual optical wavelength or optical frequency shift for each of said at least two gratings, based on said measured modulation phase shifts and measured modulation magnitudes.

29. A sensor system, comprising:
an optical modulation system for modulating a light beam;
an optical coupler for coupling said light beam into a fiber formed with a plurality of gratings and receiving light reflected off the gratings; and
an optical and electrical analysis system configured for measuring at least one phase shift in a modulation of light reflected off the grating, and determining at least one physical quantity effecting a perturbation of said grating;
wherein said optical and electrical analysis system comprises a dispersive optical device configured for dispersing said reflected light beam prior to said measurement of said at least one phase shift, wherein said dispersing is characterized by a dispersion coefficient, wherein a value of said coefficient is varied over a plurality of dispersion coefficient values; and
wherein said optical and electrical analysis system is configured for measuring a modulation phase shift and modulation magnitude of light reflected off the grating for each value of said dispersion coefficient, and determining an individual optical wavelength or optical frequency shift for each of said at least two gratings, based on said measured modulation phase shifts and measured modulation magnitudes.

30. A method of determining perturbation of a plurality of gratings formed in an optical fiber, the method comprising:
modulating and transmitting a light beam through the optical fiber, wherein said modulating comprises scanning a frequency of said modulation over a plurality of modulation frequencies;
dispersing light reflected off the gratings;
measuring a modulation phase shift and modulation magnitude of said reflected light for each modulation frequency; and
determining perturbation of at least two of the gratings based on said measured modulation phase shifts and measured modulation magnitudes;
wherein said dispersing is prior to said measurement of said at least one phase shift;
wherein said dispersing is characterized by a dispersion coefficient, wherein the method comprises varying a value of said coefficient over a plurality of dispersion coefficient values, measuring a modulation phase shift and modulation magnitude of light reflected off the grating for each value of said dispersion coefficient, and determining an individual optical wavelength or optical frequency shift for each of said plurality of gratings, based on said measured modulation phase shifts and measured modulation magnitudes.

* * * * *